United States Patent
Liu et al.

(10) Patent No.: US 10,234,835 B2
(45) Date of Patent: Mar. 19, 2019

(54) MANAGEMENT OF COMPUTING DEVICES USING MODULATED ELECTRICITY

(71) Applicant: Microsoft Technology Licensing, LLC, Redmond, WA (US)

(72) Inventors: Jie Liu, Medina, WA (US); Brian Janous, Issaquah, WA (US); Gregory Joseph McKnight, Bellevue, WA (US); Sean James, Olympia, WA (US); Ricardo Bianchini, New Brunswick, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 613 days.

(21) Appl. No.: 14/673,829

(22) Filed: Mar. 30, 2015

(65) Prior Publication Data
US 2016/0011575 A1 Jan. 14, 2016

Related U.S. Application Data

(60) Provisional application No. 62/023,785, filed on Jul. 11, 2014.

(51) Int. Cl.
| | | |
|---|---|---|
| G05B 15/02 | (2006.01) | |
| G06Q 50/06 | (2012.01) | |
| H02J 3/02 | (2006.01) | |
| H02J 3/14 | (2006.01) | |

(52) U.S. Cl.
CPC ............ *G05B 15/02* (2013.01); *G06Q 50/06* (2013.01); *H02J 3/02* (2013.01); *H02J 3/14* (2013.01); *Y02B 70/3225* (2013.01); *Y04S 20/222* (2013.01)

(58) Field of Classification Search
CPC ........................................................ H02J 3/02
See application file for complete search history.

(56) References Cited

U.S. PATENT DOCUMENTS 1,363,707 A * 12/1920 Beard ..................... H02J 3/02
307/3
2,398,390 A * 4/1946 Ogurkowski ............ H02J 3/02
307/3
(Continued)

FOREIGN PATENT DOCUMENTS

CN 1510570 A 7/2004
CN 101088072 A 12/2007
(Continued)

OTHER PUBLICATIONS

Kant, Krishna, "Distributed Energy Adaptive Computing", Proceedings of the IEEE International Conference on Communications, May 2010, 5 pages.
(Continued)

*Primary Examiner* — Jarede Fureman
*Assistant Examiner* — Joel Barnett
(74) *Attorney, Agent, or Firm* — Rainier Patents, P.S.

(57) ABSTRACT

This document relates to management of computing devices using modulated electricity. One example includes assigning a set of time slices to a computing device for drawing electricity and subsequently causing the computing device to adjust consumption of the electricity by assigning a different set of time slices to the computing device.

20 Claims, 13 Drawing Sheets

(56) References Cited

U.S. PATENT DOCUMENTS

| | | |
|---|---|---|
| 4,928,220 A * | 5/1990 | White .................. H02H 1/043 361/111 |
| 5,576,700 A | 11/1996 | Davis et al. |
| 5,742,103 A | 4/1998 | Ashok |
| 6,263,315 B1 | 7/2001 | Talluri |
| 6,452,289 B1 | 9/2002 | Lansberry |
| 6,644,247 B2 | 11/2003 | Campion |
| 6,795,928 B2 | 9/2004 | Bradley et al. |
| 6,812,811 B2 * | 11/2004 | Robison .................. H02J 3/02 333/175 |
| 6,868,682 B2 | 3/2005 | Sharma et al. |
| 7,110,913 B2 | 9/2006 | Moore et al. |
| 7,111,061 B2 | 9/2006 | Leighton et al. |
| 7,122,913 B2 | 10/2006 | Witten et al. |
| 7,127,625 B2 | 10/2006 | Farkas et al. |
| 7,134,011 B2 | 11/2006 | Fung |
| 7,135,956 B2 | 11/2006 | Bartone et al. |
| 7,136,830 B1 | 11/2006 | Kuelbs et al. |
| 7,149,605 B2 | 12/2006 | Chassin et al. |
| 7,272,735 B2 | 9/2007 | Fung |
| 7,318,154 B2 | 1/2008 | Tehee, Jr. |
| 7,321,221 B2 | 1/2008 | Bucker et al. |
| 7,350,186 B2 | 3/2008 | Coleman et al. |
| 7,365,973 B2 | 4/2008 | Rasmussen et al. |
| 7,373,268 B1 | 5/2008 | Viredaz et al. |
| 7,379,884 B2 | 5/2008 | Barsness |
| 7,430,459 B1 | 9/2008 | Papalia et al. |
| 7,437,730 B2 | 10/2008 | Goyal |
| 7,484,111 B2 | 1/2009 | Fung |
| 7,500,001 B2 | 3/2009 | Tameshige et al. |
| 7,525,207 B2 | 4/2009 | Clidaras |
| 7,551,130 B2 | 6/2009 | Altenschulte |
| 7,552,350 B2 | 6/2009 | Fung |
| 7,560,823 B2 | 7/2009 | Schellings |
| 7,568,360 B1 | 8/2009 | Bash et al. |
| 7,604,535 B2 | 10/2009 | Germagian et al. |
| 7,606,719 B2 | 10/2009 | Barsness |
| 7,608,937 B1 | 10/2009 | Altenschulte |
| 7,711,587 B2 | 5/2010 | DeMarcken |
| 7,752,858 B2 | 7/2010 | Johnson et al. |
| 7,797,563 B1 | 9/2010 | Moll |
| 7,820,321 B2 | 10/2010 | Horne |
| 7,844,370 B2 | 11/2010 | Pollack et al. |
| 7,881,057 B2 | 2/2011 | Fink |
| 7,903,407 B2 | 3/2011 | Matsushima et al. |
| 7,923,965 B2 | 4/2011 | Ritter |
| 7,961,463 B2 | 6/2011 | Belady et al. |
| 8,041,967 B2 | 10/2011 | Belady et al. |
| 8,080,898 B2 | 12/2011 | Fukuhara |
| 8,080,900 B2 | 12/2011 | Corhodzic |
| 8,082,454 B2 | 12/2011 | Totten |
| 8,145,731 B2 | 3/2012 | Cherkasova et al. |
| 8,164,897 B2 | 4/2012 | Graybill et al. |
| 8,174,225 B2 | 5/2012 | Mazumdar et al. |
| 8,189,561 B2 | 5/2012 | Karaoguz et al. |
| 8,225,119 B2 | 7/2012 | Jain |
| 8,258,761 B2 | 9/2012 | Hammerstrom |
| 8,271,807 B2 | 9/2012 | Jackson |
| 8,332,666 B2 | 12/2012 | Boss et al. |
| 8,333,316 B2 | 12/2012 | Heath et al. |
| 8,359,125 B2 | 1/2013 | Park |
| 8,364,322 B2 | 1/2013 | Oury et al. |
| 8,370,652 B2 | 2/2013 | Liu et al. |
| 8,401,709 B2 | 3/2013 | Cherian et al. |
| 8,458,011 B2 | 6/2013 | Al-Dawsari |
| 8,588,989 B1 | 11/2013 | Brooks et al. |
| 8,595,515 B1 | 11/2013 | Weber et al. |
| 8,645,722 B1 | 2/2014 | Weber et al. |
| 8,650,420 B2 | 2/2014 | Kato et al. |
| 8,839,254 B2 | 9/2014 | Horvitz et al. |
| 8,849,469 B2 | 9/2014 | Belady et al. |
| 9,003,216 B2 | 4/2015 | Sankar et al. |
| 9,063,738 B2 | 6/2015 | Jain et al. |
| 9,207,993 B2 | 12/2015 | Jain |
| 9,450,838 B2 | 9/2016 | Jain et al. |
| 9,519,878 B2 | 12/2016 | Sankar et al. |
| 9,654,173 B2 * | 5/2017 | Barzegar .................. H04B 3/54 |
| 2002/0004913 A1 | 1/2002 | Fung |
| 2002/0041126 A1 | 4/2002 | Provanzana et al. |
| 2002/0152305 A1 | 10/2002 | Jackson et al. |
| 2003/0079151 A1 | 4/2003 | Bohrer |
| 2003/0101263 A1 | 5/2003 | Bouillet et al. |
| 2003/0115495 A1 | 6/2003 | Rawson |
| 2003/0193777 A1 | 10/2003 | Friedrich et al. |
| 2003/0196126 A1 | 10/2003 | Fung |
| 2004/0078153 A1 | 4/2004 | Bartone et al. |
| 2004/0177057 A1 | 9/2004 | Fairchild et al. |
| 2004/0236846 A1 | 11/2004 | Alvarez et al. |
| 2004/0267897 A1 | 12/2004 | Hill et al. |
| 2005/0132051 A1 | 6/2005 | Hill |
| 2005/0190912 A1 | 9/2005 | Hopkins et al. |
| 2005/0193113 A1 | 9/2005 | Kokusho |
| 2005/0241810 A1 | 11/2005 | Malone et al. |
| 2005/0256952 A1 | 11/2005 | Mouhanna et al. |
| 2006/0017328 A1 | 1/2006 | Bryde |
| 2006/0017809 A1 | 1/2006 | Carroll |
| 2006/0036878 A1 | 2/2006 | Rothman |
| 2006/0041537 A1 | 2/2006 | Ahmed |
| 2006/0044117 A1 | 3/2006 | Farkas et al. |
| 2006/0080213 A1 | 4/2006 | Inoue |
| 2006/0184287 A1 | 8/2006 | Belady et al. |
| 2006/0276938 A1 | 12/2006 | Miller |
| 2006/0277109 A1 | 12/2006 | Kerth et al. |
| 2007/0010914 A1 | 1/2007 | Johnson et al. |
| 2007/0049133 A1 | 3/2007 | Conroy |
| 2007/0097636 A1 | 5/2007 | Johnson et al. |
| 2007/0130341 A1 | 6/2007 | Ma |
| 2007/0136392 A1 | 6/2007 | Oh et al. |
| 2007/0250838 A1 | 10/2007 | Belady et al. |
| 2007/0294408 A1 | 12/2007 | Jackson |
| 2008/0028246 A1 | 1/2008 | Witham |
| 2008/0030078 A1 | 2/2008 | Whitted |
| 2008/0049714 A1 | 2/2008 | Commarford et al. |
| 2008/0072090 A1 | 3/2008 | O'Connor |
| 2008/0141048 A1 | 6/2008 | Palmer |
| 2008/0201720 A1 | 8/2008 | Betzler |
| 2008/0234873 A1 | 9/2008 | Gorbatov et al. |
| 2008/0255899 A1 | 10/2008 | McConnell et al. |
| 2008/0313101 A1 | 12/2008 | Helander et al. |
| 2008/0316938 A1 | 12/2008 | Shi |
| 2009/0063122 A1 | 3/2009 | Nasle |
| 2009/0070611 A1 | 3/2009 | Bower, III et al. |
| 2009/0106571 A1 | 4/2009 | Low et al. |
| 2009/0119233 A1 | 5/2009 | Dunagan et al. |
| 2009/0119523 A1 | 5/2009 | Totten |
| 2009/0146815 A1 | 6/2009 | Cho |
| 2009/0201293 A1 | 8/2009 | Tung et al. |
| 2009/0215375 A1 | 8/2009 | Hagensen |
| 2009/0228726 A1 | 9/2009 | Malik et al. |
| 2009/0229194 A1 | 9/2009 | Armillas |
| 2009/0235097 A1 | 9/2009 | Hamilton et al. |
| 2009/0248854 A1 | 10/2009 | Conway |
| 2009/0251860 A1 | 10/2009 | Belady et al. |
| 2009/0254660 A1 | 10/2009 | Hanson |
| 2009/0265568 A1 | 10/2009 | Jackson |
| 2009/0265704 A1 | 10/2009 | Branda et al. |
| 2009/0271046 A1 | 10/2009 | Lewis |
| 2009/0276771 A1 | 11/2009 | Nickolov et al. |
| 2009/0279444 A1 | 11/2009 | Ravindran et al. |
| 2009/0281674 A1 | 11/2009 | Taft |
| 2009/0281846 A1 | 11/2009 | Rose |
| 2009/0295167 A1 | 12/2009 | Clidaras et al. |
| 2009/0319090 A1 | 12/2009 | Dillon et al. |
| 2010/0003545 A1 | 1/2010 | Horne et al. |
| 2010/0017045 A1 | 1/2010 | Nesler et al. |
| 2010/0020806 A1 | 1/2010 | Vandat et al. |
| 2010/0037038 A1 | 2/2010 | Bieswanger |
| 2010/0049616 A1 | 2/2010 | Hipsher |
| 2010/0050172 A1 | 2/2010 | Ferris |
| 2010/0057641 A1 | 3/2010 | Boss |
| 2010/0058350 A1 | 3/2010 | Boss |
| 2010/0060079 A1 | 3/2010 | MacLellan et al. |
| 2010/0061250 A1 | 3/2010 | Nugent |
| 2010/0076615 A1 | 3/2010 | Daniel et al. |

(56) References Cited

U.S. PATENT DOCUMENTS

| | | |
|---|---|---|
| 2010/0088150 A1 | 4/2010 | Mazhar et al. |
| 2010/0088205 A1 | 4/2010 | Robertson et al. |
| 2010/0100696 A1 | 4/2010 | Suzuki |
| 2010/0145801 A1 | 6/2010 | Chekure |
| 2010/0191998 A1 | 7/2010 | Moore |
| 2010/0211669 A1 | 8/2010 | Dalgas et al. |
| 2010/0218186 A1 | 8/2010 | Wolfe et al. |
| 2010/0228819 A1 | 9/2010 | Wei |
| 2010/0235903 A1 | 9/2010 | Carter et al. |
| 2010/0248609 A1 | 9/2010 | Tresh et al. |
| 2010/0250358 A1 | 9/2010 | Elkins, II et al. |
| 2010/0306776 A1 | 12/2010 | Greene |
| 2010/0313203 A1 | 12/2010 | Dawson et al. |
| 2010/0314942 A1 | 12/2010 | Talkin et al. |
| 2010/0318454 A1 | 12/2010 | Warnicke et al. |
| 2010/0319004 A1 | 12/2010 | Hudson et al. |
| 2010/0332373 A1 | 12/2010 | Crabtree et al. |
| 2010/0332401 A1 | 12/2010 | Prahlad et al. |
| 2010/0333105 A1 | 12/2010 | Horvitz et al. |
| 2010/0333116 A1 | 12/2010 | Prahlad et al. |
| 2011/0016214 A1 | 1/2011 | Jackson |
| 2011/0018342 A1 | 1/2011 | Park et al. |
| 2011/0035072 A1 | 2/2011 | Jackson |
| 2011/0055034 A1 | 3/2011 | Ferris et al. |
| 2011/0077795 A1 | 3/2011 | VanGilder et al. |
| 2011/0099095 A1 | 4/2011 | Moore et al. |
| 2011/0105015 A1 | 5/2011 | Carlson |
| 2011/0106321 A1 | 5/2011 | Cherian et al. |
| 2011/0115641 A1 | 5/2011 | Hidalgo Rodrigo |
| 2011/0131309 A1 | 6/2011 | Akiyama et al. |
| 2011/0138708 A1 | 6/2011 | Chazelle et al. |
| 2011/0144818 A1 | 6/2011 | Li et al. |
| 2011/0161526 A1 | 6/2011 | Ravindran |
| 2011/0173465 A1 | 7/2011 | Akers et al. |
| 2011/0205949 A1 | 8/2011 | Maenpaa et al. |
| 2011/0208605 A1 | 8/2011 | Hadar et al. |
| 2011/0231552 A1 | 9/2011 | Carter |
| 2011/0240265 A1 | 10/2011 | Dechene |
| 2011/0271283 A1 | 11/2011 | Bell, Jr. et al. |
| 2011/0276192 A1 | 11/2011 | Ropp |
| 2011/0276194 A1* | 11/2011 | Emalfarb ............ B60L 11/1838 700/297 |
| 2011/0278928 A1 | 11/2011 | Burger et al. |
| 2011/0282982 A1 | 11/2011 | Jain |
| 2011/0288898 A1 | 11/2011 | Roe |
| 2011/0296019 A1 | 12/2011 | Ferris |
| 2012/0016721 A1 | 1/2012 | Weinman |
| 2012/0030356 A1 | 2/2012 | Fletcher |
| 2012/0032631 A1 | 2/2012 | Bourilkov et al. |
| 2012/0053925 A1 | 3/2012 | Geffin et al. |
| 2012/0059532 A1 | 3/2012 | Reifenhäuser et al. |
| 2012/0065805 A1 | 3/2012 | Montalvo |
| 2012/0066519 A1 | 3/2012 | El-Essawy et al. |
| 2012/0089726 A1 | 4/2012 | Doddavula |
| 2012/0095940 A1 | 4/2012 | Borgs et al. |
| 2012/0101639 A1 | 4/2012 | Carralero et al. |
| 2012/0109705 A1 | 5/2012 | Belady et al. |
| 2012/0115433 A1 | 5/2012 | Young |
| 2012/0130554 A1 | 5/2012 | Jain et al. |
| 2012/0158447 A1 | 6/2012 | Jain |
| 2012/0181853 A1 | 7/2012 | Polese |
| 2012/0217821 A1 | 8/2012 | Bin Jamlus et al. |
| 2012/0217921 A1 | 8/2012 | Wu et al. |
| 2012/0245744 A1 | 9/2012 | Prosser et al. |
| 2012/0259760 A1 | 10/2012 | Sgouridis et al. |
| 2012/0278503 A1 | 11/2012 | DeCusatis et al. |
| 2012/0290725 A1 | 11/2012 | Podilla |
| 2012/0323398 A1 | 12/2012 | Boss et al. |
| 2012/0330711 A1 | 12/2012 | Jain et al. |
| 2012/0331113 A1 | 12/2012 | Jain et al. |
| 2012/0331317 A1 | 12/2012 | Rogers et al. |
| 2013/0015713 A1 | 1/2013 | Hagihara |
| 2013/0041514 A1 | 2/2013 | Apalened et al. |
| 2013/0054044 A1 | 2/2013 | Shaffer et al. |
| 2013/0063273 A1 | 3/2013 | Bhageria et al. |
| 2013/0086404 A1 | 4/2013 | Sankar et al. |
| 2013/0138482 A1 | 5/2013 | Anderson et al. |
| 2013/0162215 A1 | 6/2013 | Cooper |
| 2013/0179061 A1 | 7/2013 | Gadh et al. |
| 2013/0191052 A1 | 7/2013 | Fernandez et al. |
| 2013/0201316 A1 | 8/2013 | Binder et al. |
| 2013/0212410 A1 | 8/2013 | Li et al. |
| 2013/0261817 A1 | 10/2013 | Detmers et al. |
| 2013/0274947 A1 | 10/2013 | Miller et al. |
| 2013/0318371 A1 | 11/2013 | Hormuth |
| 2013/0345888 A1 | 12/2013 | Forbes |
| 2014/0025220 A1 | 1/2014 | Carlson et al. |
| 2014/0039965 A1 | 2/2014 | Steven et al. |
| 2014/0075222 A1 | 3/2014 | Jackson |
| 2014/0142767 A1 | 5/2014 | Hjelm et al. |
| 2014/0365402 A1 | 12/2014 | Belady et al. |
| 2015/0015213 A1 | 1/2015 | Brooks et al. |
| 2016/0011607 A1 | 1/2016 | James et al. |
| 2016/0011616 A1 | 1/2016 | Janous et al. |
| 2016/0011617 A1 | 1/2016 | Liu et al. |
| 2016/0011618 A1 | 1/2016 | Janous et al. |
| 2016/0013647 A1 | 1/2016 | Liu et al. |
| 2016/0013652 A1 | 1/2016 | Li et al. |
| 2016/0013980 A1 | 1/2016 | McKnight et al. |
| 2016/0344595 A1 | 11/2016 | Jain et al. |

FOREIGN PATENT DOCUMENTS

| | | |
|---|---|---|
| CN | 100458605 C | 2/2009 |
| CN | 101430596 A | 5/2009 |
| CN | 101916415 A | 12/2010 |
| CN | 102664401 A | 9/2012 |
| CN | 101096942 B | 3/2013 |
| CN | 103311940 A | 9/2013 |
| CN | 103518301 A | 1/2014 |
| CN | 103593717 A | 2/2014 |
| EP | 2287991 A1 | 2/2011 |
| EP | 2511870 A1 | 10/2012 |
| EP | 2701261 A1 | 2/2014 |
| EP | 2701266 A1 | 2/2014 |
| JP | 2003-162591 | 6/2003 |
| JP | 2003-324956 | 11/2003 |
| JP | 2006-508445 A | 3/2006 |
| JP | 2007-249470 | 9/2007 |
| JP | 2007-324956 | 12/2007 |
| KR | 10-2005-0084874 | 8/2005 |
| KR | 10-2009-0120704 A | 11/2009 |
| WO | 2004/049157 A2 | 6/2004 |
| WO | 2004/092971 A1 | 10/2004 |
| WO | 2009/012451 A2 | 1/2009 |
| WO | 2010/010544 A2 | 1/2010 |

OTHER PUBLICATIONS

Kant, Krishna, "Power Control of High Speed Network Interconnects in Data Centers", IEEE INFOCOM Workshops, Apr. 2009, 6 pages.

Karve et al., "Dynamic Placement for Clustered Web Applications", Proceedings of the Fifteenth International World Wide Web Conference, May 22-26, 2006, 10 pages.

Kirkpatrick, Scott, "Optimization by Simulated Annealing: Quantitative Studies", Journal of Statistical Physics, vol. 34, Nos. 5/6, 1984, pp. 975-986, 12 pages.

Klingert et al., "GreenSLAs for the Energy-efficient Management of Data Centres", International Conference on Energy-Efficient Computing and Networking, May 31-Jun. 1, 2011, 10 pages.

Krioukov et al., "Design and Evaluation of an Energy Agile Computing Cluster", University of California at Berkeley, Technical Report No. UBC/EECS-2012-13, Jan. 17, 2012, 14 pages.

Krioukov et al., "Integrating Renewable Energy Using Data Analytics Systems: Challenges and Opportunities", Bulletin of the IEEE Computer Society Technical Committee on Data Engineering, Mar. 2011, 9 pages.

Le et al., "Managing the Cost, Energy Consumption, and Carbon Footprint of Internet Services," SIGMETRICS'10, Jun. 14-18, 2010, 2 pages.

(56) References Cited

OTHER PUBLICATIONS

Le et al., "Cost- and Energy-Aware Load Distribution Across Data Centers", Workshop on Power Aware Computing and Systems, Oct. 2009, 5 pages.
Le et al., "Reducing Electricity Cost Through Virtual Machine Placement in High Performance Computing Clouds", International Conference for High Performance Computing, Networking, Storage and Analysis, Nov. 12-18, 2011, 12 pages.
Levin et al., "Dynamic Pricing in the Presence of Strategic Consumers and Oligopolistic Competition", Management Science, vol. 55, No. 1, Jan. 2009, 37 pages.
Levin et al., "Optimal Dynamic Pricing of Perishable Items by a Monopolist Facing Strategic Consumers", Production and Operations Management, 2009, 53 pages.
Li et al., "Load Balancing for Multi-tiered Database Systems through Autonomic Placement of Materialized Views", Proceedings of the 22nd International Conference on Data Engineering (ICDE 2006), 2006, 1 page.
Li et al., "iSwitch: Coordinating and Optimizing Renewable Energy Powered Server Clusters", International Symposium on Computer Architecture, Jun. 2012, 12 pages.
Lim et al., "Power Budgeting for Virtualized Data Centers", Proceedings of the 2011 USENIX Annual Technical Conference, (USENIX ATC '11), Jun. 15, 2011, 14 pages.
Liu et al., "GreenCloud: A New Architecture for Green Data Center", Proceedings of the 6th International Conference on Autonomic Computing and Communications Industry Session, Jun. 16, 2009, 10 pages.
Liu et al., "Renewable and Cooling Aware Workload Management for Sustainable Data Centers", International Conference on Measurement and Modeling of Computer Systems, Jun. 11-15, 2012, 12 pages.
Mankoff et al., "Some Computer Science Issues in Creating a Sustainable World", Computer, vol. 41, No. 8, Aug. 2008, pp. 94-97, 4 pages.
Maxim Integrated, "Switching Between Battery and External Power Sources", retrieved at <<htp://www.maximintegrated.com/app-notes/index.mvp/id/1136>>, Jun. 27, 2002, 4 pages.
McGeehan, Patrick, "Heat Wave Report: 102 Degrees in Central Park", The New York Times, Jul. 6, 2010, 17 pages.
Miller, Rich, "Data Centers Scale Up Their Solar Power", retrieved at <<http://www.datacenterknowledge.com/archives/2012/05/14/data-centers-scales-up-their-solar-power/>>, May 14, 2012, 2 pages.
Mohsenian-Rad et al., "Coordination of Cloud Computing and Smart Power Grids", First IEEE International Conference on Smart Grid Communications (SmartGridComm), Oct. 4, 2010, pp. 368-372, 5 pages.
Pauley, Wayne A., "Cloud Provider Transparency: An Empirical Evaluation", published Aug. 19, 2010 in IEEE Security and Privacy, vol. 8, No. 6, Nov./Dec. 2010, pp. 32-39, 8 pages.
Pelley et al., "Power Routing: Dynamic Power Provisioning in the Data Center", International Conference on Architectural Support for Programming Languages and Operating Systems, Mar. 13-17, 2010, 12 pages.
Perry, Michael, "Australian Greens Propose A$23/ton carbon tax", Reuters, Jan. 29, 2010, 2 pages.
Pflueger et al., "Data Center Efficiency in the Scalable Enterprise", Dell Power Solutions, Feb. 2007, pp. 8-14, 7 pages.
Popa et al., "Enabling Security in Cloud Storage SLAs with CloudProof", Microsoft Research Technical Report MSR-TR-2010-46, May 2010, pp. 1-12, 12 pages.
Qureshi et al., "Cutting the Electric Bill for Internet-Scale Systems", Proceedings of the ACM SIGCOMM 2009 Conference on Data Communication, New York, NY, Aug. 17-21, 2009, pp. 123-134, 12 pages.
Rao et al., "Minimizing Electricity Cost: Optimization of Distributed Internet Data Centers in a Multi-Electricity-Market Environment", INFOCOM, 2010, 9 pages.

Cho et al., "Strategic Consumer Response to Dynamic Pricing of Perishable Products," International Series in Operations Research and Management Science, vol. 131, Aug. 2008, 36 pages.
Clark et al., "Live Migration of Virtual Machines", Proceedings of the Second ACM/USENIX Symposium on Networked Systems Design and Implementation, May 2005, 14 pages.
Dasu et al., "Dynamic Pricing When Consumers are Strategic: Analysis of a Posted Pricing Scheme", European Journal of Operational Research, vol. 204, Issue 3, 2010, pp. 1-23, 23 pages.
Deng et al., "Concentrating Renewable Energy in Grid-Tied Datacenters", Proceedings of the International Symposium on Sustainable Systems and Technology, May 2011, 6 pages.
Dimosthenis et al., "A Real-time Service Oriented Infrastructure", GSTF Journal on Computing, Feb. 2011, pp. 196-204, 18 pages.
Dunn, David, "Data Center Energy Efficiency Through BCM", Industry Perspectives, Jan. 22, 2010, 7 pages.
Fan et al., "Power Provisioning for a Warehouse-sized Computer", Proceedings of the ACM International Symposium on Computer Architecture, Jun. 2007, 11 pages.
Feitelson, D., "Parallel Workload Archive", 2009, retrieved at <<http://www.cs.huji.ac.il/abs/parallel/workload/l_anl_int/index.html>>, 5 pages.
Felter et al., "A Performance-Conserving Approach for Reducing Peak Power Consumption in Server Systems", ICS'05, Boston, MA, Jun. 20-22, 2005, 10 pages.
Fiat et al., "Better Algorithms for Unfair Metrical Task Systems and Applications", Proceedings of the 32nd Annual ACM Symposium on Theory of Computing, 2000, New York, NY, pp. 725-734, 20 pages.
Ganti et al., "Smart Grid as a Driver for Energy-Intensive Industries: A Data Center Case Study", Proceedings of Grid-Interop, Dec. 3, 2012, 7 pages.
Giannakoudis et al., "Optimum Design and Operation Under Uncertainty of Power Systems Using Renewable Energy Sources and Hydrogen Storage", International Journal of Hydrogen Energy, vol. 35, Issue 3, Feb. 2010, pp. 872-891, 20 pages.
Gmach et al., "Capacity Planning and Power Management to Exploit Sustainable Energy", Proceedings of the 2010 International Conference on Network and Service Management, Oct. 25-29, 2010, pp. 96-103, 8 pages.
Goiri et al., "Energy-aware Scheduling in Virtualized Datacenters", IEEE International Conference on Cluster computing, Sep. 2010, 10 pages.
Goiri et al., "GreenHadoop: Leveraging Green Energy in Data-Processing Frameworks", ACM European Conference on Computer Systems, Apr. 10-13, 2012, 14 pages.
Goiri et al., "GreenSlot: Scheduling Energy Consumption in Green Datacenters", International Conference for High Performance Computing, Networking, Storage and Analysis, Nov. 12-18, 2011, 11 pages.
Goiri et al., "Parasol and GreenSwitch: Managing Datacenters Powered by Renewable Energy", International conference on Architectural Support for Programming Languages and Operating Systems, Mar. 16-20, 2013, 13 pages.
Govindan et al., "Benefits and Limitations of Tapping into Stored Energy for Datacenters", Proceedings of the International Symposium on Computer Architecture, Jun. 4-8, 2011, 11 pages.
GreenQloud, captured by the Internet archive at <<http://web.archive.org/web/20140629201826/https://www.greenqloud.com/>> on Jun. 29, 2014, 4 pages.
GreenQloud, "GreenQloud Monthly Pricing Calculator," captured by the Internet archive at <<https://web.archive.org/web/20130223025741/http://greenqloud.com/pricing/>> on Feb. 23, 2013, 2 pages.
Grossman, Robert L., "The Case for Cloud Computing", IT Professionalism, vol. 11, No. 2, Mar. 21, 2009, pp. 23-27, 5 pages.
Gurobi Optimization Inc., "Gurobi Optimization", captured by the Internet archive at <<https://web.archive.org/web/20140701004029/http://www.gurobi.com/>> on Jul. 1, 2014, 2 pages.
Haque et al., "Providing Green SLAs in High Performance Computing Clouds", Proceedings of the Sustainable computing and Comuting for Sustainability International Green Computing Conference, Jun. 27, 2013, 11 pages.

(56) References Cited

OTHER PUBLICATIONS

Harrison, Andrew, "Symantec Energy Efficient Date Center Solutions", retrieved from <<http://m.softchoice.com/filed/pdf/about/sustain-enable/Symantec.energy_efficient_data_center_solutions.pdf>>, Symantec Corporation, Jan. 12, 2008, 15 pages.
Iranli et al., "System-Level Power Management: An Overview", The VLSI Handbook Second Edition, Dec. 2006, 22 pages.
Jain et al., "SLA-Integrated Pricing Models for Cloud Computing", Microsoft Research, Oct. 18, 2010, 5 pages.
Jain, Navendu, "An Optimization Framework for Dynamic Client-Server Partitioning in the IMA application", Apr. 16, 2010, 3 pages.
Jiang et al., "Enabling Autonomic Power-Aware Management of Instrumented Data Centers", Proceedings of the 2009 IEEE International Symposium on Parallel & Distributed Processing, 2009, 8 pages.
Kahn, Chris, "As power demand soars from hot weather, grid holds up so far", Jul. 7, 2010, Associated Press, 1 page.
Kant, Krishna, "Data Center Evolution: A Tutorial on State of the Art, Issues, and Challenges", Computer Networks, vol. 53, Issue 17, Dec. 3, 2009, pp. 2939-2965, 27 pages.
Analog Devices, "EVAL-ADM1911/EVAL-ADM 1192 User Guide UG-658" retrieved from <<http://www.analog.com/media/en/technical-documentation/evaluation-documentation/EVAL-ADM1191_ADM1192.pdf>>, 2008-2014, pp. 1-24, 24 pages.
Analog Devices, "USB-SDP-CABLEZ User Guide UG-404", retrieved at <<http://www.analog.com/media/en/technical-documentation/user-guides/UG-404_pdf>>, 2012, pp. 1-12, 12 pages.
Apple Inc., "Data Centers & Renewable Energy", captured by the Internet archive at <<https://web.archive.org/web/20130201101842/http://www.apple.com/-environment/renewable-energy/>>, on Feb. 1, 2013, 4 pages.
Ardagna et al., "SLA Based Profit Optimization in Multi-Tier Systems", Proceedings of the Fourth IEEE International Symposium on Network Computing and Applications, Jul. 27-29, 2005, 4 pages.
Bansal et al., "A Primal-Dual Randomized Algorithm for Weighted Paging", retrieved at <<http://www.cs.technion.ac.il/~nivb/papers/weighted-paging.pdf>>, 2007, 11 pages.
Bansal et al., "Randomized Competitive Algorithms for Generalized Caching", Proceedings of the 40th Annual ACM Symposium on Theory of Computing, May 17-20, 2008, pp. 235-244, 10 pages.
Bansal et al., "Towards the Randomized k-Server Conjecture: A Primal-Dual Approach", Proceedings of the 21st Annual ACM-SIAM Symposium on Discrete Algorithms, 2010, Society for Industrial and Applied Mathematics, Philadelphia, PA, 24 pages.
Bansal et al. "Metrical Task Systems and the k-Server Problem on HSTs", Proceedings of the 37th International Colloquium on Automata, Languages and Programming, 2010, 12 pages.
Bartal et al., "A polylog (n)-competitive algorithm for metrical task systems", Proceedings of the 29th Annual ACM Symposium on Theory of Computing, 1997, New York, NY, pp. 711-719, 9 pages.
Battles et al., "Reducing Data Center Power Consumption through Efficient Storage", Network Appliance, Inc., Sunnyvale, CA, WP-7010-0207, Feb. 2007, 9 pages.
Beloglazov et al., "Energy Efficient Resource Management in Virtualized Cloud Data Centers", Proceedings of the Tenth IEEE/ACM International Conference on Cluster, Cloud, and Grid Computing, May 17-20, 2010, 6 pages.
Benini et al., "Policy Optimization for Dynamic Power Management", IEEE Transactions on Computer-Aided Design pf Integrated Circuits and Systems, vol. 18, No. 6, Jun. 1999, pp. 813-833, 21 pages.
Bianchini et al., "Power and Energy Management for Server Systems", from Journal Computer archive, vol. 37, Issue 11, Nov. 2004, 11 pages.
Bobroff et al., "Dynamic Placement of Virtual Machines for Managing SLA Violations", IFIP/IEEE International Symposium on Integrated Network Management, May 2007, 10 pages.

Bodik et al., "Response-Time Modeling for Resource Allocation and Energy-Informed SLA's," Proceedings of the Vorkshop on Statistical Learning Techniques for Solving Systems Problems (MS Sys'07), Dec. 8, 2007, 3 pages.
Bonvin et al., "Autonomic SLA-driven Provisioning for Cloud Applications", 11th IEEE/ACM International Symposium on Cluster, Cloud and Grid Computing (CCGrid), May 23-26, 2011, 10 pages.
Borenstein et al. "Dynamic Pricing, Advanced Metering, and Demand Response in Electricity Markets", University of California Energy Institute, UC Berkeley, Oct. 31, 2002, 102 pages.
Borgs et al., "Optimal Mechanisms for Perishable Goods With Variable Supply and Demand", Aug. 11, 2010, 8 pages.
Borodin et al., "An Optimal On-Line Algorithm for Metrical Task System", Journal of the ACM, vol. 39, No. 4, Oct. 1992, pp. 745-763, 19 pages.
Borodin et al., "Online Computation and Competitive Analysis", Table of Contents, Cambridge University Press, New York, NY, 1998, 6 pages.
Breitgand et al., "SLA-aware placement of multi-virtual machine elastic services in compute clouds", International Symposium on Integrated Network Management, May 2011, 9 pages.
Buchbinder et al., "The Design of Competitive Online Algorithms Via a Primal-dual Approach", Foundations and Trends in Theoretical Computer Science, vol. 3, Issue 2-3, 2007, 174 pages.
Buchbinder et al., "Online Job-Migration for Reducing the Electricity Bill in the Cloud", Lecture Notes in Computer Science, Networking 2011 Proceedings of the 10thInternational IFIP TC 6 Conference on Networking, vol. 6640, Part I, Mar. 13, 2011, 12 pages.
Butler, Declan, "France unveils carbon tax", Nature News, Sep. 15, 2009, 4 pages.
Buyya et al., "Cloudbus Toolkit for Market-Oriented Cloud Computing", Proceedings of the 1st International Conference on Cloud Computing, Oct. 11, 2009, pp. 24-44, 21 pages.
Chase et al., "Managing Energy and Server Resources in Hosting Centers", Proceedings of the Eighteenth ACM Symposium on Operating Systems Principles, 2001,pp. 103-116, 14 pages.
Chaver et al., "Energy-Aware Fetch Mechanism: Trace Cache and BTB Customization", Proceedings of the International Symposium on Low Power Electronics and Design, Aug. 8-10, 2005, pp. 42-47, 6 pages.
Chen et al., "Dynamic Server Power Capping for Enabling Data Center Participation in Power Markets", Proceedings of the International Conference on Computer-Aided Design, Nov. 18, 2013, 8 pages.
Chen et al., "Energy-Aware Server Provisioning and Load Dispatching for Connection-Intensive Internet Services", Proceedings of the 5th USENIX Symposium on Networked Systems Design and Implementation, 2008, 14 pages.
Chiu et al., "Electric Grid Balancing through Low-Cost Workload Migration", ACM SIGMETRICS Performance Evaluation Review, vol. 40 Issue 3, Dec. 2012, 5 pages.
"Amazon EC2 Pricing", captured by the Internet archive at <<https://web.archive.org/web/20130307213605/http://aws.amazon.com/pricing/ec2/>>, on Mar. 7, 2013, 9 pages.
"Amazon Elastic Compute Cloud (Amazon EC2)", captured by the Internet archive at <<https://web.archive.org/web/20130501132521/http://aws.amazon.com/ec2/>>, in May 1, 2013, 15 pages.
"ASG-Workload Optimization Suite for Comprehensive Workload Analysis andForecasting", Allen Systems Group, Inc., 2010, 1 page.
"Carbon Dioxide Emissions from the Generation of Electric Power in the United States", Department of Energy and Environmental Protection Agency, Jul. 2000, retrieved at<<http://www.eia.gov/cneaf/electricity/page/oo2_report/co2report.html>>, 21 pages.
"Consultants: How and Why Pay Per Performance Works (Part 2—continuation from last post)", Weblog posting published Apr. 19, 2010, retrieved at <<http://bizrelationships.wordpress.com/2010/04/19/consultants-how-and-why-pay-perperformance-works-part-2-continuation-from-last-post>>, 5 pages.
"Global Reporting Initiative", captured by the Internet archive at <<http://web.archive.org/web/20140625183534/https://www.globalreporting.org/Pages/default.aspx>> on Jun. 25, 2014, 2 pages.

(56) References Cited

OTHER PUBLICATIONS

"Green Data Centers Pairing Energy Efficiency with Affordability", Green House Data, captured by the Internet archive at <<http://web.archive.org/web/20140701072144/http://www.greenhousedata.com/about-us/green-data-centers/>> on Jul. 1, 2014, 3 pages.
"Green Webhosts", EcoBusinessLinks, captured by the Internet archive at <<https://web.archive.org/web/20130122202308/http://www.ecobusinesslinks.com/green webhosts/>>, on Jan. 22, 2013, 4 pages.
"Leading the Evolution of the Data Center", Brocade Communications Systems, Inc., San Jose, CA, 2008, 8 pages.
"PlateSpin Recon", retrieved at <<http://www.novell.com/products/recon/consolidation_ratios.html>> on Mar. 13, 2011, Novell, Inc., 2009, 3 pages.
"Power Management in the Cisco Unified Computing System: An Integrated Approach", White Paper of Cisco, retrieved at <<http://www.cisco.com/c/en/us/solutions/collateral/data-center-virtualization/unified-computing/white_paper_c11-627731.html>> on Aug. 7, 2014, 17 pages.
"Reducing Data Center Power and Energy Consumption: Saving Money and "Going Green"", retrieved at <<http://www.gtsi.com/cms/documents/white-papers/green-it.pdf>>, Jan. 10, 2010, 16 pages.
"Secure VMware Hosting & Colocation Services," Green House Data, captured by the Internet archive at <<http://web.archive.org/web/20140625065009/http://www.greenhousedata.com/>> on Jun. 25, 2014, 2 pages.
"Server Power Management Comparison: Dell Openmanage Power Center and HP Insight Control", published Sep. 2012, retrieved at<<http://en.community.dell.com/cfs-file.ashx/_key/telligent-evolution-components-attachments/13-4491-00-00-20-22-78-75/Dell-Open-Manage-Power-Center-vs-HP-Insight-Control.pdf>>, 25 pages.
"Smart Grids Arrive Step by Step", retrieved Jul. 25, 2014, available at: <<http://www.eue24.net/pi/index.php?StoryID=253&articleID=238316>>, 4 pages.
"Solar chimney", Wikipedia, the free encyclopedia, captured by the Internet archive from <<www.http://en.wikipedia.org/wiki/Solar_chimney>> on Feb. 7, 2009, 5 pages.
"The Path to a Green Data Center", Hitachi Data Systems and Brocade, Joint Solution Brief, Brocade Communications Systems, Inc., San Jose, CA, 2007, 8 pages.
"What is an SLA?", Sensible Cloud, retrieved at <<http://www.sensiblecloud.com/2010/11/what-is-sla/>> on Mar. 24, 2011, 5 pages.
"Windows Azure Platform", retrieved at <<http://www.microsoft.com/windowsazure/>> on Aug. 5, 2010, 2 pages.
"Zeus launches data center load balancing solution", Jun. 28, 2007, retrieved at <<http://www.continuitycentral.com/news03343.htm>>, Continuity Central, 1 page.
"About Vibes Interactive", Vibes Interactive LLC, 2010, retrieved at <<http://www.vibesinteractive.com/about_us.html>> on Mar. 24, 2011, 1 page.
"Grid'5000 Project", captured by the Internet archive at <<https://web.archive.org/web/20051028161139/http://www.grid5000.fr>>, on Oct. 28, 2005, 1 page.
"Tout+Interactive", Mar. 22, 2011, retrieved at <<http://toutinteractive.com/>>, 8 pages.
AISO.net, captured by the Internet archive at <<http://web.archive.org/web/20140704021857/http://www.aiso.net/>>, on Jul. 4, 2014, 1 page.
Aksanli et al., "Utilizing Green Energy Prediction to Schedule Mixed Batch and Service Jobs in Data Centers", Proceedings of the 4th Workshop on Power-Aware Computing and Systems, Oct. 23, 2011, 5 pages.
Analog Devices, "ADM1191: Digital Power Monitor with Convert Pin and ALERTB Output", Datasheet and Product Info, retrieved from <<http://www.analog.com/en/products/power-management/power-monitors-ic/adm1191.html>>, 1995-2015, pp. 1-7, 7 pages.
Analog Devices, "Digital Power Monitor with Convert Pin and ALERTB Output", ADM1191 Data Sheet, retrieved from <<http://www.analog.com/media/en/technical-documentation/data-sheets/ADM1191.pdf>>, 2006-2012, pp. 1-16, 16 pages.

Notice of Allowance dated Apr. 9, 2014 from U.S. Appl. No. 12/951,977, 12 pages.
Notice of Allowance dated May 21, 2014 from U.S. Appl. No. 12/951,977, 9 pages.
Notice of Allowance dated Sep. 5, 2014 from U.S. Appl. No. 12/951,977, 7 pages.
Notice of Allowance dated Dec. 24, 2014 from U.S. Appl. No. 12/951,977, 7 pages.
Notice of Allowance dated Apr. 15, 2015 from U.S. Appl. No. 12/951,977, 8 pages.
Non-Final Office Action dated Jun. 21, 2012 from U.S. Appl. No. 12/973,399, 20 pages.
Response filed Aug. 27, 2012 to the Non-Final Office Action dated Jun. 21, 2012 from U.S. Appl. No. 12/973,399, 18 pages.
Final Office Action dated Oct. 3, 2012 from U.S. Appl. No. 12/973,399, 25 pages.
Response filed Jan. 23, 2013 to the Final Office Action dated Oct. 3, 2012 from U.S. Appl. No. 12/973,399, 16 pages.
Non-Final Office Action dated Jul. 3, 2014 from U.S. Appl. No. 12/973,399, 26 pages.
U.S. Appl. No. 62/023,777 titled "Server Installation as a Grid Condition Sensor" filed Jul. 11, 2014 by Inventors Liu et al., 30 pages.
Requirement Restriction dated Aug. 8, 2016 from U.S. Appl. No. 14/675,163, 6 pages.
Response filed Sep. 23, 2016 to the Requirement Restriction dated Aug. 8, 2016 from U.S. Appl. No. 14/675,163, 7 pages.
Non-Final Office Action dated Nov. 4, 2016 from U.S. Appl. No. 14/675,163, 34 pages.
Response filed Dec. 8, 2016 to the Non-Final Office Action dated Nov. 4, 2016 from U.S. Appl. No. 14/675,163, 10 pages.
International Search Report and Written Opinion dated Sep. 30, 2015 from PCT Patent Application No. PCT/US2015/039462, 10 pages.
International Preliminary Report on Patentability dated Jul. 12, 2016 from PCT Patent Application No. PCT/US2015/039462, 7 pages.
Response and Demand filed Jan. 13, 2016 to the International Search Report and Written Opinion dated Sep. 30, 2015 from PCT Patent Application No. PCT/US2015/039462, 11 pages.
Second Written Opinion dated Apr. 21, 2016 from PCT Patent Application No. PCT/US2015/039462, 6 pages.
U.S. Appl. No. 62/023,785 titled "Energy Routing Within a Server Installation" filed Jul. 11, 2014 by Inventors Liu et al., 32 pages.
Rasmussen, Neil, "Implementing Energy Efficient Data Centers", White Paper #114, American Power Conversion, retrieved from <<http://www.apcmedia.com/salestools/NRAN-6LXSHX_R0_EN.pdf>>, 2006, pp. 1-15, 15 pages.
Sharma et al., "Blink: Managing Server Clusters on Intermittent Power", International Conference on Architectural Support for Programming Languages and Operating Systems, Mar. 5-11, 2011, 14 pages.
Sharma et al., "Cloudy Computing: Leveraging Weather Forecasts in Energy Harvesting Sensor Systems", International Conference on Sensor Mesh and Ad Hoc Communications and Networks, Jun. 2010, 9 pages.
Sleator et al., "Amortized Efficiency of List Update and Paging Rules", Communications of the ACM, vol. 28, Issue 2, Feb. 1985, pp. 202-208, 7 pages.
"Solar updraft tower", Wikipedia the free encyclopedia, archived on Feb. 1, 2009, <<http://web.archive.org/web/20090201144032/http://en.wikipedia.org/wiki/Solar_updraft_tower>>, 6 pages.
Stewart et al., "Some Joules Are More Precious Than Others: Managing Renewable Energy in the Datacenter", Workshop on Power Aware Computing and Systems, Oct. 2009, 5 pages.
Sweeting, Andrew, "Dynamic Pricing Behavior in Perishable Goods Markets: Evidence from Secondary Markets for Major League Baseball Tickets", Duke University, Feb. 2010, pp. 1-65, 65 pages.
Timmer, John, "Renewable energy and the future of the datacenter", Arstechnica.com Business News, May 28, 2008, 2 pages.
U.S. Energy Information Administration, "Electric Power Monthly", retrieved from <<http://www.eia.gov/electricity/monthly/epm table grapher.cfm?-t=epmt_5_6_b>>, Jan. 2013, 190 pages.

(56) References Cited

OTHER PUBLICATIONS

UK Government, "Carbon Reduction Commitment", Oct. 20, 2010, captured by the Internet archive at <<https://web.archive.org/web/20110311230843/http://www.carbonreductioncommitment.info/>>, 3 pages.
Urgaonkar et al., "Dynamic Provisioning of Multi-tier Internet Applications,", Proceedings of the Second International Conference on Automatic Computing, Jun. 13-16, 2005, 12 pages.
USENIX, "Technical Sessions", Proceedings of the Fifth Usenix Symposium on Networked Systems Design and Implementation, Apr. 16-18, 2008, 4 pages.
Vazirani, Vijay, "Approximation Algorithms", Springer, 2001, 396 pages.
Verma et al., "BrownMap: Enforcing Power Budget in Shared Data Centers", Middleware 2010, Springer Berlin Heidelberg, 2010, pp. 42-63, 22 pages.
Verma et al., "pMapper: Power and Migration Cost Aware Application Placement in Virtualized Systems", International Middleware Conference, Dec. 2008, pp. 243-264, 22 pages.
Wang et al., "Coordination of the Smart Grid and Distributed Data Centers: A Nested Game-Based Optimization Framework", IEEE PES Innovative Smart Grid Technologies Conference, Feb. 19, 2014, 5 pages.
Wang et al., "Datacenters as Controllable Load Resources in the Electricity Market", IEEE 33rd International Conference on Distributed Computing Systems, Jul. 8, 2013, pp. 176-185, 10 pages.
Wang et al., "Exploring Smart Grid and Data Center Interactions for Electric Power Load Balancing", ACM SIGMETRICS Performance Evaluation Review, vol. 41, Issue 3, Dec. 2013, 6 pages.
Wang et al., "Feedback Control Algorithms for Power Management of Servers", Proceedings of the Third International Workshop on Feedback Control Implementation and Design in Computing Systems and Networks, Jun. 2008, 6 pages.
Wang et al., "Markdown Money Contracts for Perishable Goods with Clearance Pricing", European Journal of Operational Research, vol. 196, 2009, pp. 1113-1122, 10 pages.
Zhang et al., "Cloud Computing: State-of-the-Art and Research Challenges", Journal of Internet Services and Applications, vol. 1(1), Apr. 20, 2010, pp. 7-18, 12 pages.
U.S. Appl. No. 62/023,772 titled "Power Management of Server Installations" filed Jul. 11, 2014 by Inventors Liu et al., 27 pages.
International Search Report and Written Opinion dated Oct. 23, 2015 from PCT Patent Application No. PCT/US2015/039459, 13 pages.
Response and Demand filed Dec. 28, 2015 to the International Search Report and Written Opinion dated Oct. 23, 2015 from PCT Patent Application No. PCT/US2015/039459, 9 pages.
Second Written Opinion dated Feb. 8, 2016 from PCT Patent Application No. PCT/US2015/039459, 4 pages.
International Preliminary Report on Patentability dated Jun. 6, 2016 from PCT Patent Application No. PCT/US2015/039459, 8 pages.
Non-Final Office Action dated Nov. 19, 2013 from U.S. Appl. No. 13/251,777, 14 pages.
Response filed Feb. 19, 2014 to the Non-Final Office Action dated Nov. 19, 2013 from U.S. Appl. No. 13/251,777, 12 pages.
Final Office Action dated Jul. 15, 2014 from U.S. Appl. No. 13/251,777, 10 pages.
Response filed Oct. 15, 2014 to the Final Office Action dated Jul. 15, 2014 from U.S. Appl. No. 13/251,777, 10 pages.
Response filed Feb. 17, 2017 to the Requirement for Restriction Election dated Dec. 15, 2016 from U.S. Appl. No. 14/464,650, 7 pages.
Communication pursuant to Rules 161(1) and 162 EPC dated Feb. 17, 2017 from European Patent Application No. 15741442.6, 2 pages.
Non-Final Office Action dated Mar. 10, 2017 from U.S. Appl. No. 12/913,763, 107 pages.
Non-Final Office Action dated Apr. 10, 2017 from U.S. Appl. No. 14/674,821, 91 pages.
Final Office Action dated Mar. 24, 2017 from U.S. Appl. No. 14/675,163, 120 pages.
International Preliminary Report on Patentability dated Jan. 26, 2017 from PCT Patent Application No. PCT/US2015/039463, 9 pages.
International Search Report & Written Opinion dated Nov. 23, 2015 from PCT Patent Application No. PCT/US2015/039463, 16 Pages.
Third Office Action datled Dec. 31, 2014 from Chinese Patent Application No. 201080009556.7, 7 pages.
Response filed Mar. 4, 2015 to the Third Office Action dated Dec. 31, 2014 from Chinese Patent Application No. 201080009556.7, 15 pages.
Notice on Grant dated Apr. 13, 2015 from Chinese Patent Application No. 201080009556.7, 7 pages.
Communication and Extended European Search Report dated Nov. 14, 2012 from European Patent Application No. 10744134.7, 6 pages.
Communication pursuant to Rules 70(2) and 70a(2) EPC dated Dec. 3, 2012 from European Patent Application No. 10744134.7, 1 page.
Response filed Jan. 30, 2013 to the Communication pursuant to Rules 70(2) and 70a(2) EPC dated Dec. 3, 2012 from European Patent Application No. 10744134.7, 15 pages.
Examination Report dated Oct. 17, 2014 from European Patent Application No. 10744134.7, 7 pages.
Response filed Feb. 16, 2015 to the Examination Report dated Oct. 17, 2014 from European Patent Application No. 10744134.7, 10 pages.
Examination Report dated Aug. 10, 2015 from European Patent Application No. 10744134.7, 6 pages.
Response filed Dec. 8, 2015 to the Examination Report dated Aug. 10, 2015 from European Patent Application No. 10744134.7, 11 pages.
Examination Report dated Mar. 21, 2016 from European Patent Application No. 10744134.7, 5 pages.
Response filed Apr. 12, 2016 to the Examination report dated Mar. 21, 2016 from European Patent Application No. 10744134.7, 17 pages.
Intention to Grant dated Jul. 15, 2016 from European Patent Application No. 10744134.7, 36 pages.
Decision to Grant dated Oct. 13, 2016 from European Patent Application No. 10744134.7, 2 pages.
Amendment filed Jan. 30, 2013 from Japanese Patent Application No. 2011-551110, 7 pages.
Notice of Rejection dated Jul. 2, 2013 from Japanese Patent Application No. 2011-551110, 9 pages.
Response filed Oct. 2, 2013 to the Notice of Rejection dated Jul. 2, 2013 from Japanese Patent Application No. 2011-551110, 11 pages/
Second Office Action dated Mar. 11, 2014 from Japanese Patent Application No. 2011-551110, 11 pages.
Response filed Jun. 11, 2014 to the Second Office Action dated Mar. 11, 2014 from Japanese Patent Application No. 2011-551110, 16 pages.
Notice of Allowance dated Nov. 11, 2014 from Japanese Patent Application No. 2011-551110, 7 pages.
Request for Examination with Voluntary Amendment filed Dec. 30, 2014 from Korean Patent Application No. 10-2011-7019493, 17 pages.
Response filed Feb. 16, 2016 to the Office Action dated Dec. 16, 2015 from Korea Patent Application No. 10-2011-7019493, 23 pages.
Notice of Allowance dated Feb. 22, 2016 from Korea Patent Application No. 10-2011-7019493, 6 pages.
Non-Final Office Action dated Apr. 3, 2013 from U.S. Appl. No. 12/781,445, 11 pages.
Response filed Aug. 2, 2013 to the Non-Final Office Action dated Apr. 3, 2013 from U.S. Appl. No. 12/781,445, 14 pages.
Non-Final Office Action dated Dec. 3, 2013 from U.S. Appl. No. 12/781,445, 16 pages.
Response filed Apr. 1, 2014 to the Non-Final Office Action dated Dec. 3, 2013 from U.S. Appl. No. 12/781,445, 12 pages.
Final Office Action dated May 5, 2014 from U.S. Appl. No. 12/781,445, 12 pages.

(56) References Cited

OTHER PUBLICATIONS

Response filed Sep. 15, 2014 to the Final Office Action dated May 5, 2014 from U.S. Appl. No. 12/781,445, 10 pages.
Non-Final Office Action dated Sep. 23, 2014 from U.S. Appl. No. 12/781,445, 12 pages.
Response filed Jun. 5, 2017 to the Non-Final Office Action dated Mar. 10, 2017 from U.S. Appl. No. 14/464,650, 10 pages.
International Search Report and Written Opinion dated Dec. 23, 2011 from PCT Patent Application No. PCT/US2011/036364, 8 pages.
International Preliminary Report on Patentability dated Nov. 20, 2012 from PCT Patent Application No. PCT/US2011/036364, 4 pages.
First Office Action dated Sep. 16, 2014 from Chinese Patent Application No. 201180024779.5, 12 pages.
Non-Final Office Action dated Nov. 21, 2012 from U.S. Appl. No. 12/779,059, 26 pages.
Amendment/Response filed Feb. 15, 2013 to the Non-Final Office Action dated Nov. 21, 2012 from U.S. Appl. No. 12/779,059, 9 pages.
Final Office Action dated Apr. 11, 2013 from U.S. Appl. No. 12/779,059, 31 pages.
Response filed Aug. 10, 2013 to the Final Office Action dated Apr. 11, 2013 from U.S. Appl. No. 12/779,059, 11 pages.
Non-Final Office Action dated Dec. 5, 2014 from U.S. Appl. No. 12/779,059, 22 pages.
Response filed Apr. 17, 2013 to the Final Office Action dated Dec. 17, 2012 from U.S. Appl. No. 12/951,977, 15 pages.
Response filed Apr. 6, 2015 to the Non-Final Office Action dated Dec. 5, 2014 from U.S. Appl. No. 12/779,059, 13 pages.
Notice of Allowance and Examiner-Initiated Interview Summary dated May 20, 2015 from U.S. Appl. No. 12/779,059, 76 pages.
Notice of Allowance dated Sep. 24, 2015 from U.S. Appl. No. 12/779,059, 30 pages.
Requirement for Restriction dated Jun. 7, 2012 from U.S. Appl. No. 12/913,763, 10 pages.
Response filed Jun. 27, 2012 to the Requirement for Restriction Election dated Jun. 7, 2012 from U.S. Appl. No. 12/913,763, 10 pages/
Non-Final Office Action dated Dec. 31, 2012 from U.S. Appl. No. 12/913,763, 15 pages.
Response filed Apr. 30, 2013 to the Non-Final Office Action dated Dec. 31, 2012 from U.S. Appl. No. 12/913,763, 16 pages.
Notice of Allowance dated Aug. 23, 2013 from U.S. Appl. No. 12/913,763, 9 pages.
Notice of Allowance dated Mar. 11, 2014 from U.S. Appl. No. 12/913,763, 22 pages.
Notice of Allowance dated Jul. 7, 2014 from U.S. Appl. No. 12/913,763, 8 pages.
Notice of Allowance dated Aug. 15, 2014 from U.S. Appl. No. 12/913,763, 8 pages.
Preliminary Amendment filed Aug. 20, 2014 from U.S. Appl. No. 14/464,650, 8 pages.
Requirement for Restriction Election dated Dec. 15, 2016 from U.S. Appl. No. 14/464,650, 9 pages.
Requirement for Restriction Election dated Jun. 22, 2012 from U.S. Appl. No. 12/951,977, 6 pages.
Response filed Jul. 23, 2012 to the Requirement for Restriction Election dated Jun. 22, 2012 from U.S. Appl. No. 12/951,977, 7 pages.
Requirement for Restriction Election dated Aug. 2, 2012 from U.S. Appl. No. 12/951,977, 7 pages.
Response filed Aug. 13, 2012 to the Requirement for Restriction Election dated Aug. 2, 2012 from U.S. Appl. No. 12/951,977, 6 pages.
Non-Final Office Action dated Sep. 4, 2012 from U.S. Appl. No. 12/951,977, 10 pages.

Response filed Nov. 29, 2012 to the Non-Final Office Action dated Sep. 4, 2012 from U.S. Appl. No. 12/951,977, 12 pages.
Final Office Action dated Dec. 17, 2012 from U.S. Appl. No. 12/951,977, 19 pages.
Amendment filed Jun. 30, 2017 from Chinese Patent Application No. 201580037843.1, 13 pages.
Response filed Jun. 26, 2017 to the Final Office Action dated Mar. 24, 2017 from U.S. Appl. No. 14/675,163, 12 pages.
Applicant-Initiated Interview Summary and Office Appendix dated Jun. 28, 2017 from U.S. Appl. No. 14/675,163, 4 pages.
Notice of Allowance dated Aug. 21, 2017 from U.S. Appl. No. 14/675,163, 24 pages.
Response filed Jul. 21, 2017 to the Communication Pursuant to Rules 161(1) and 162 EPC dated Feb. 17, 2017 from European Patent Application No. 15741442.6, 8 pages.
Response filed Aug. 2, 2017 to the Communication dated Feb. 17, 2017 from European Patent Application No. 15739732.4, 8 pages.
"Amendment Filed in Chinese Patent Application No. 201580044786. X", Filed Date: Sep. 21, 2017, 12 Pages.
"Amendment Filed in Chinese Patent Application No. 201580048797. 5", Filed Date: Sep. 7, 2017, 16 Pages.
Notice of Allowance dated Sep. 20, 2017 from U.S. Appl. No. 14/464,650, 14 pages.
Notice of Allowance dated Nov. 7, 2014 from U.S. Appl. No. 13/251,777, 5 pages.
Non-Final Office Action dated May 13, 2016 from U.S. Appl. No. 14/679,699, 11 pages.
Response filed Jul. 14, 2016 to the Non-Final Office Action dated May 13, 2016 from U.S. Appl. No. 14/679,699, 9 pages.
Notice of Allowance dated Aug. 10, 2016 from U.S. Appl. No. 14/679,699, 14 pages.
Non-Final Office Action dated Oct. 7, 2011 from U.S. Appl. No. 12/492,385, 14 pages.
Response filed Jan. 6, 2012 to the Non-Final Office Action dated Oct. 7, 2011 from U.S. Appl. No. 12/492,385, 15 pages.
Final Office Action dated Mar. 15, 2012 from U.S. Appl. No. 12/492,385, 16 pages.
Response filed Jul. 16, 2012 to the Final Office Action dated Mar. 15, 2012 from U.S. Appl. No. 12/492,385, 17 pages.
Notice of Allowance and Examiner-Initiated Interview Summary dated Feb. 19, 2013 from U.S. Appl. No. 12/492,385, 14 pages.
Notice of Allowance dated Jul. 18, 2013 from U.S. Appl. No. 12/492,385, 6 pages.
Notice of Allowance dated Mar. 31, 2014 from U.S. Appl. No. 12/492,385, 18 pages.
Supplemental Amendment dated Jun. 6, 2014 from U.S. Appl. No. 12/492,385, 8 pages.
Notice of Allowance dated Jun. 24, 2014 from U.S. Appl. No. 12/492,385, 7 pages.
Notice of Allowance dated Jul. 30, 2014 from U.S. Appl. No. 12/492,385, 8 pages.
Non-Final Office Action dated Aug. 1, 2011 from U.S. Appl. No. 12/391,188, 12 pages.
Applicant-Initiated Interview Summary dated Oct. 31, 2011 from U.S. Appl. No. 12/391,188, 3 pages.
Response filed Nov. 16, 2011 to the Non-Final Office Action dated Aug. 1, 2011 from U.S. Appl. No. 12/391,188, 11 pages.
Final Office Action dated Dec. 19, 2011 from U.S. Appl. No. 12/391,188, 17 pages.
Applicant-Initiated Interview Summary dated Feb. 22, 2012 from U.S. Appl. No. 12/391,188, 3 pages.
Response filed Mar. 19, 2012 to the Final Office Action dated Dec. 19, 2011 from U.S. Appl. No. 12/391,188, 11 pages.
Notice of Allowance dated Apr. 2, 2012 from U.S. Appl. No. 12/391,188, 5 pages.
International Search Report and Written Opinion dated Sep. 30, 2010 from PCT Patent Application No. PCT/US2010/023253, 9 pages.
International Preliminary Report on Patentability dated Aug. 23, 2011 from PCT Patent Application No. PCT/US2010/023253, 5 pages.

(56) References Cited

OTHER PUBLICATIONS

First Office Action dated Jul. 29, 2013 from Chinese Patent Application No. 201080009556.7, 11 pages.
Response filed Dec. 9, 2013 to the First Office Action dated Jul. 29, 2013 from Chinese Patent Application No. 201080009556.7, 15 pages.
Second Office Action dated Feb. 21, 2014 from Chinese Patent Application No. 201080009556.7, 10 pages.
Response filed May 7, 2014 to the Second Office Action dated Feb. 21, 2014 from Chinese Patent Application No. 201080009556.7, 16 pages.
Decision on Rejection dated Jul. 31, 2014 from Chinese Patent Application No. 201080009556.7, 7 pages.
Response filed Nov. 14, 2014 to the Decision on Rejection dated Jul. 31, 2014 from Chinese Patent Application No. 201080009556.7, 12 pages.
Decision on Reexamination dated Dec. 16, 2014 from Chinese Patent Application No. 201080009556.7, 3 pages.
Examination Report dated Jan. 2, 2018 from European Patent Application No. 15741442.6, 8 pages.
Chen, et al., "Dynamic Server Power Capping for Enabling Data Center Participation in Power Markets", In Proceedings of the International Conference on Computer-Aided Design, Nov. 18, 2013, 8 pages.
"Power Management in the Cisco Unified Computing System: An Integrated Approach", In White Paper of Cisco, Retrieved on: Aug. 6, 2014, 17 pages.
"Server Power Management Comparison: Defl Openmanage Power Center and HP Insight Control", Published on: Sep. 2012, Available at: http://en.community.dell.com/cfs-file.ashx/_key/telligent-evolution-components-attachments/13-4491-00-00-20-22-78-75/Dell-Open-Manage-Power-Center-vs-HP-Insight-Control.pdf.
"HP Power Capping and HP Dynamic Power Capping for ProLiant Servers", Published on: Jan. 23, 2014.
Benini, et al., "Policy Optimization for Dynamic Power Management", In IEEE Transactions on Computer-Aided Design of Integrated Circuits and Systems, vol. 18, No. 16, Jun. 1999, pp. 813-833.
"Carbon Tax Center", Retrieved From: https://web.archive.org/web/20100803170957/http://www.carbontax.org/, Retrieved on: Aug. 5, 2010, 7 Pages.
"The Grid Workloads Archive", Retrieved From: https://web.archive.org/web/20130504155303/http://gwa.ewi.tudelft.nl/pmwiki/pmwiki.php?n=Workloads.Gwa-t-2 :, May 4, 2013, 2 Pages.
"Non Final Office Action Issued in U.S. Appl. No. 14/464,650", dated Mar. 10, 2017, 13 Pages.
"First Office Action and Search Report Issued in Chinese Patent Application No. 201580037843.1", dated Aug. 13, 2018, 16 Pages.
Belady, Christian L., "In the Data Center, Power and Cooling Costs More Than the IT Equipment it Supports", Retrieved from: https://www.electronics-cooling.com/2007/02/in-the-data-center-power-and-cooling-costs-more-than-he-it-equipment-it-supports/, Feb. 1, 2007, 6 Pages.
Chatwin, Richard E., "Optimal Dynamic Pricing of Perishable Products with Stochastic Demand and a Finite Set of Prices", in European Journal of Operational Research, vol. 125, Issue 1, Aug. 16, 2000, pp. 149-174.
Vaziran, Vijay V., "Approximation Algorithms", In Proceedings of Springer, Mar. 22, 2004, 5 Pages.

\* cited by examiner

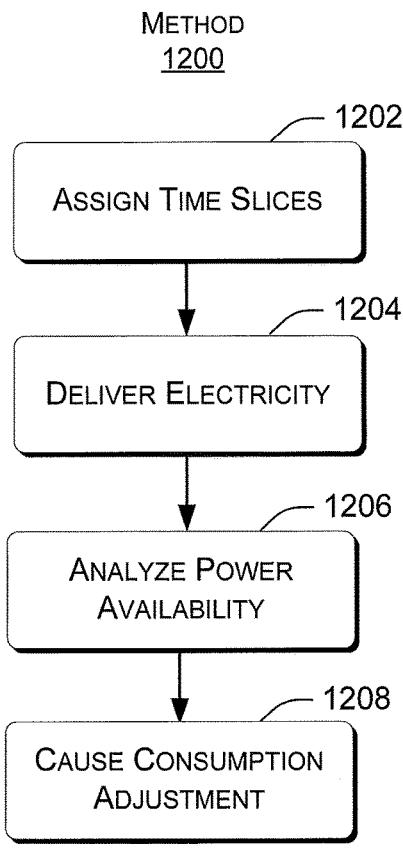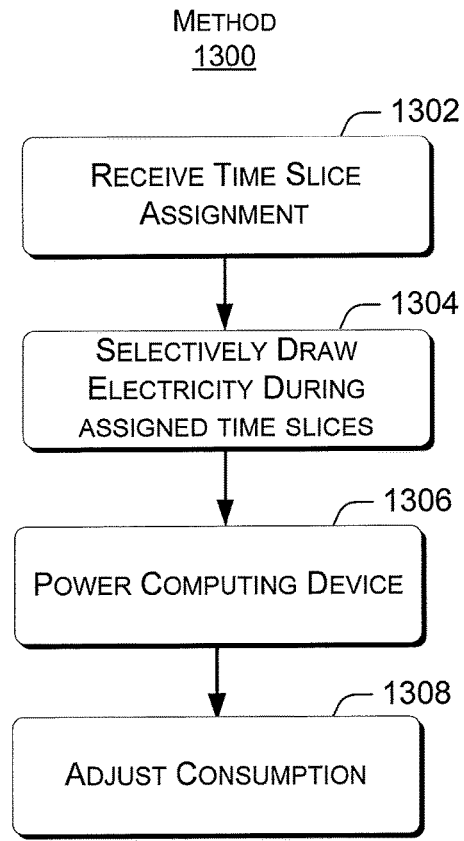
FIG. 12
FIG. 13

MANAGEMENT OF COMPUTING DEVICES USING MODULATED ELECTRICITY

PRIORITY

This application is a utility application that claims priority from provisional application 62/023,785 filed Jul. 11, 2014, which is incorporated by reference in its entirety.

BACKGROUND

Typically, electricity used to run computing devices, such as home computers, mobile devices, or servers in a server installation (e.g., data center, server farm, etc.) is fungible. Thus, different components of the electricity are indistinguishable from the perspective of the computing devices. For example, electricity can be provided by a variety of sources, such as renewable and non-renewable sources, but one cannot readily connect a computing device to an electrical grid and determine whether the computing device is running on renewable or non-renewable power. Since renewable and non-renewable energy are fungible, consumers have traditionally been indifferent to how electrical energy is sourced. However, as environmental considerations have come to the forefront of energy policy, the demand for "green" or renewable energy has increased substantially. Current mechanisms for distinguishing green energy from "brown" or fossil fuel energy are typically simple accounting mechanisms, e.g., an entity might buy a given amount of renewable electrical energy to meet regulatory requirements, obtain a tax credit, etc. However, the actual electrical energy that entity draws from the grid is typically still provided by both renewable and non-renewable sources.

Also, individual computing devices tend to draw electricity from a shared source such as an electrical grid. Typically, a given computing device can simply plug into an outlet and begin drawing power, and the operator of the computing device has somewhat limited mechanisms for monitoring and controlling how much power is consumed by the computing device. Ideally, the grid and/or computing device operators would have more refined mechanisms for allocating power consumption to individual computing devices and for monitoring power consumption by individual computing devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to management of computing devices using modulated electricity. One example is a system including a filter configured to receive modulated electricity having at least two different alternating current frequencies over an electrical line, the at least two different alternating current frequencies including a first alternating current frequency and a second alternating current frequency. The filter can also be configured to attenuate the second alternating current frequency of the modulated electricity to obtain filtered modulated electricity that is predominantly of the first alternating current frequency. The system can also include a computing device powered by the filtered modulated electricity.

Another example is a method or technique that can include assigning a set of time slices to a computing device for drawing electricity. The method or technique can also include subsequently causing the computing device to adjust consumption of the electricity by assigning a different set of time slices to the computing device.

Another is a system that can include a computing device and electrical hardware. The electrical hardware can be configured to selectively draw electricity during assigned time periods and power the computing device using the electricity that is selectively drawn during the assigned time periods.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 2, 9, 10, 12, and 13 illustrate example methods or techniques consistent with some implementations of the present concepts.

DETAILED DESCRIPTION

Overview

Figure 1:
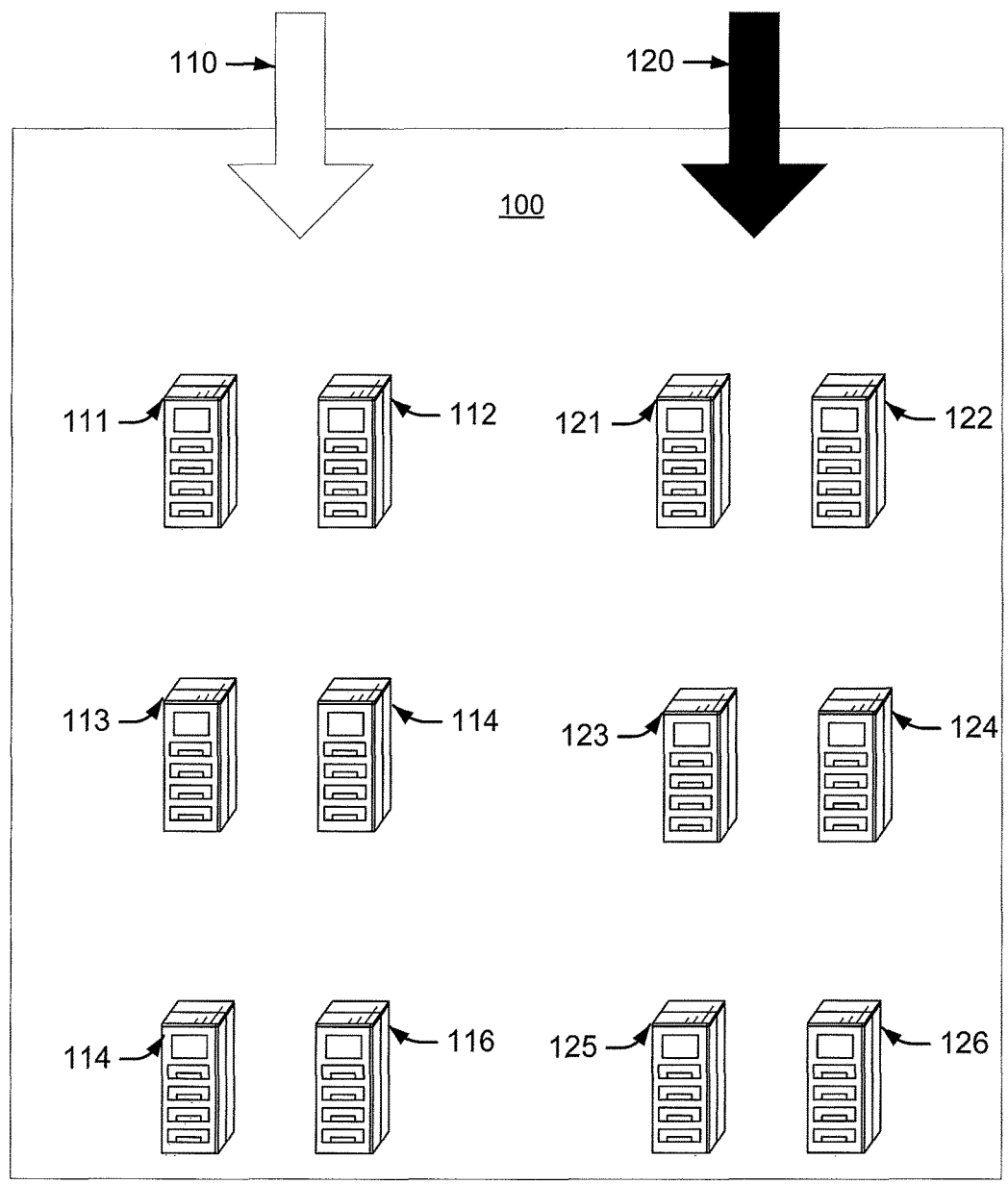
FIG. 1 illustrates power distribution in a building such as a server installation consistent with some implementations of the present concepts.

The disclosed implementations track electricity using various modulated characteristics of the electricity. For example, some implementations may modulate different alternating current frequencies for different types of electricity, e.g., 50 Hz for "green" or renewably-sourced power and 60 Hz for "brown" or fossil fuel sourced power. Other implementations may provide different assigned time slices during which different computing devices are permitted to draw power. When a given computing device or any associated electrical hardware draws power, this will modulate the electrical waveform by reducing the amount of power on a given electrical line. As used in this document, the term "modulated characteristic" can convey any characteristic of electrical power that can be manipulated. Examples of modulated characteristics that can be measured include alternating current frequency, power, voltage, current, power factor, signals encoded using electrical waveforms, etc.

For the purposes of this document, the terms "computer," "computing device," "client device," and/or "server device" as used herein can mean any type of device that has some amount of hardware processing capability. Desktop computers, laptop computers, tablets, mobile phones, tower servers, rack servers, and server blades are just some examples of computing devices. Other types of computing devices include home appliances, vehicles, and other "smart" devices.

The disclosed implementations are discussed largely with respect to a server installation, e.g., a building housing multiple servers. However, the concepts discussed herein can be performed in a wide variety of contexts. For example, the concepts discussed herein can be performed in a user's home or across a broad geographic region. In some cases, the concepts discussed herein are integrated into management of an electrical grid as discussed more below. Additionally, in some cases the disclosed implementations involve electrical hardware used to power specific computing devices. As used herein, the term "electrical equipment" refers to other devices, such as switches, transformers, filters, etc., along circuits used to deliver power to various energy consumers, such as computing devices.

Computing Device Energy Routing

Typically, electricity is viewed as a fungible resource, e.g., electricity provided to one electricity consuming device can just as readily be used by a different electricity consuming device. For example, within a given server installation, the power provided to each computing device typically has the same characteristics, e.g., voltage, frequency, etc. In some cases it may be useful to power cap a given computing device, and this can be done in several ways. In some cases, an instruction can be provided to a given computing device to reduce power consumption by lowering the CPU voltage and frequency in hardware. In other cases, virtual machines on a given computing device can be throttled in software. However, these mechanisms can be relatively coarse, depend on the computing device, operating systems, and application software to cooperate, and do not necessarily lend themselves to centralized control. Thus, it may take several control iterations for the power consumption to go down.

Thus, in some implementations, different individual computing devices are provided electrical power having different characteristics. Some computing devices may be configured to draw power provided at a first frequency (e.g., 60 hertz) and other computing devices may be configured to draw power at a different frequency (e.g., 70 hertz). For example, the computing devices may have associated electrical equipment that is configured to extract energy only from a specific frequency. In some cases, the electrical equipment can be in the form of rectifiers that convert AC voltage at a given frequency to DC voltage usable by the servers (e.g., as part of a power supply).

FIG. 1 illustrates this in more detail. FIG. 1 shows a server installation 100 drawing electrical power 110 having a first characteristic (e.g., a first frequency) and electrical power 120 having a second characteristic (e.g., a second frequency). Server racks 111, 112, 113, 114, 115, and 116 may have corresponding electrical equipment such as rectifiers/power supplies (e.g., on a rack basis or per server basis) configured to draw electrical power 110 and server racks 121, 122, 123, 124, 125, and 126 may have similar electrical equipment configured to draw electrical power 120.

In some implementations, electrical power 110 can be capped differently than electrical power 120. For example, a limit may be imposed on the power or cumulative energy consumption of electrical power 120 while allowing unlimited usage of electrical power 110. In other implementations, both electrical power 110 and 120 are capped but at different thresholds. For example, a grid and/or associated power generation facility can limit power supplied at a given frequency when the threshold is met. In other implementations, the grid is not involved and the power or energy is capped locally by the server installation.

In further implementations, the threshold on each frequency is not necessarily static. Rather, the grid, power generation facility, and/or server installation can vary the amount of power provided on the different frequencies in response to different conditions. For example, if the electrical grid has ample power, both electrical power 110 and electrical power 120 may be uncapped. If demand increases and/or supply decreases so that electrical power on the grid is somewhat constrained, electrical power 120 may be capped while leaving electrical power 110 uncapped. If the situation becomes further exacerbated, both electrical power 110 and 120 can be capped.

In some implementations, different power characteristics can be used to prioritize power delivery. For example, racks 111-116 may house a high-priority set of servers whereas racks 121-126 may house a lower-priority set of servers. Thus, the high priority servers can continually be provided power even when the lower priority servers are capped, even when they share the same physical circuit. In contrast, conventional electrical systems might use a switch or some other piece of equipment to actively prevent server racks 121-126 from consuming power beyond a certain threshold.

In further implementations, power can be modulated to maintain separate sources of power for various reasons. In one case, renewably-sourced "green" power (wind, solar, hydroelectric, etc.) is provided at a first frequency and "brown" power (generated by carbon fuels) is provided at a second frequency. In addition, different rates can be established for the different types of power. One specific instance where this can be useful is when certain clients wish to use certain types of power. By modulating green power to server racks 111-116 at a first frequency and brown power to server racks 121-126 at a second frequency, it is possible to keep these two power sources distinct. Thus, a client that wishes for a "green" computing job (e.g., a response to a query powered by renewable technology) can have their request processed by one of the servers in server racks 111-116. Likewise, a client that will accept a "brown" computing job can have their job processed by one of servers in server racks 121-126. In further implementations, different pricing mechanisms may be provided for green computing jobs and brown computing jobs, e.g., clients may need to pay a surcharge to have their jobs computed using green power.

Figure 2:
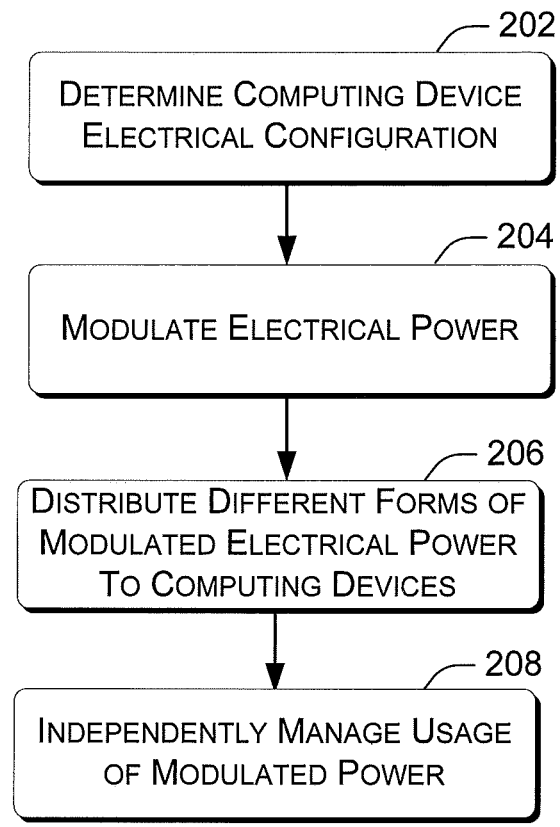

FIG. 2 shows a method 200 that can be performed by various systems as discussed further herein.

Block 202 of method 200 can determine electrical equipment configurations for various computing devices. For example, the electrical equipment configurations can correspond to various characteristics of electrical power that can be modulated. One such characteristic is frequency, in hertz, of alternating current. In some cases, one group of computing devices will have associated electrical equipment configured to draw electrical power having a first characteristic and a second group of servers will have electrical equipment configured to draw electrical power having a second characteristic.

Block 204 can modulate electrical power into different forms as appropriate for the various computing devices. For example, block 204 can modulate electrical power into two or more different frequencies.

Block 206 can distribute the modulated forms of electrical power. For example, the electrical power at the first frequency can be distributed to the first group of servers and the electrical power at the second frequency can be distributed to the second group of servers.

Block 208 can independently manage the computing devices using the modulated electrical power. For example, the first group of computing devices can be power capped differently than the second group of computing devices by applying different power capping thresholds to the two different frequencies. As another example, different pricing for computing jobs can be provided depending on the type of power used to perform the computing jobs.

In addition, for ease of exposition the aforementioned description focused largely on the use of frequency as a modulated characteristic of electrical power. However, note that other characteristics of electrical power can be used in an analogous fashion. For example, instead of multiplexing power using frequency on the same electrical lines to different servers, power can be multiplexed using time division and/or code division techniques. For example, in a time division approach, each computing devices or group of computing devices (e.g., within a rack, building, etc.) may be configured to use a particular time slice mitigated by local energy storage such as batteries, e.g., electrical power 110 may operate on a first time slice and electrical power 120 may operate on a different time slice. Likewise, electrical power 110 may be coded into different codes so that electrical power 110 uses a different code or codes than electrical power 120.

Example Grid Scenario

Figure 3:
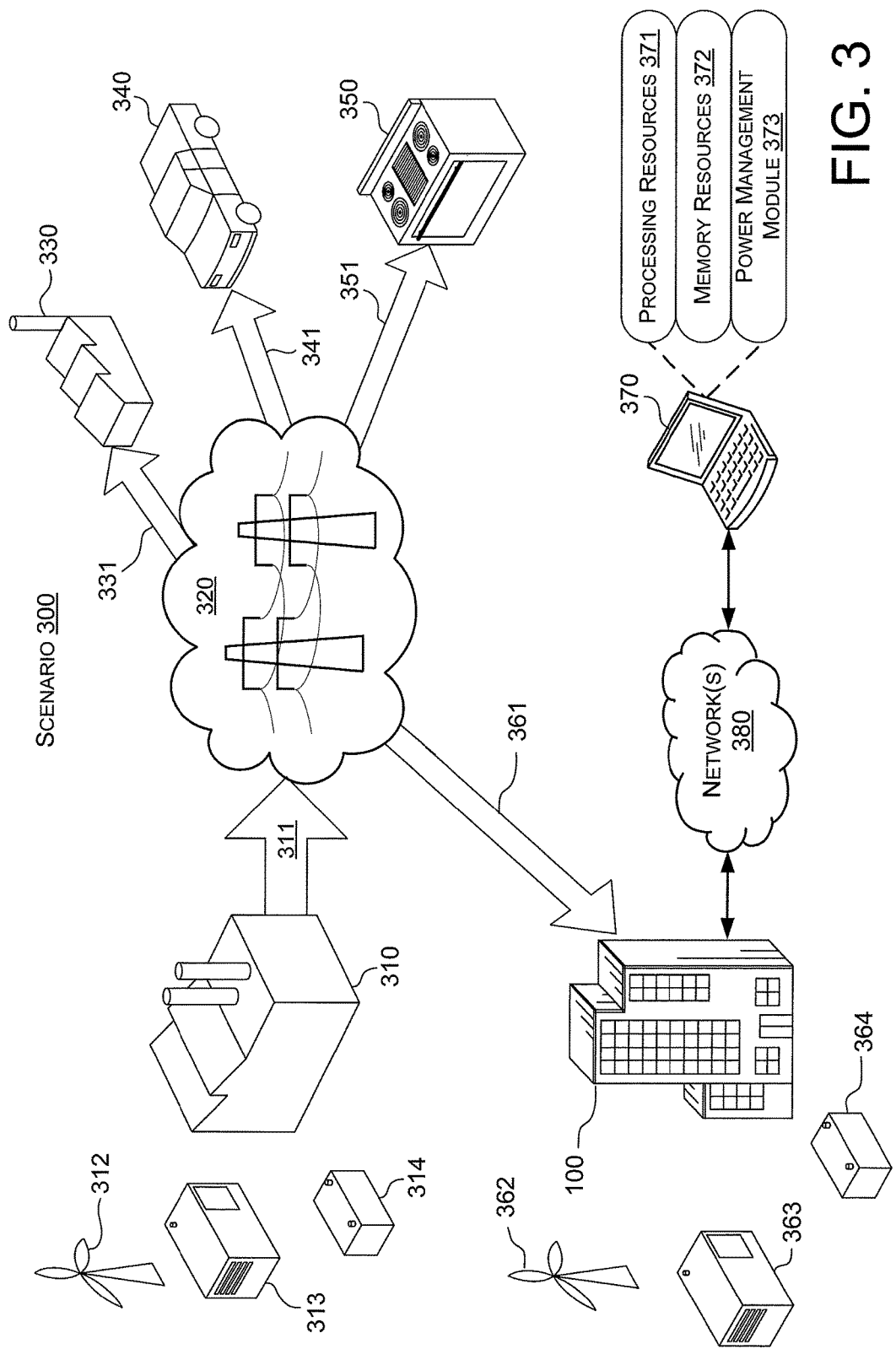
FIG. 3 illustrates an example grid scenario consistent with some implementations of the present concepts.

FIG. 3 illustrates an exemplary scenario 300 with a power generation facility 310 providing electrical power to an electrical grid 320 having electrical consumers including a factory 330, an electric car 340, an electric range 350, and server installation 100. Those skilled in the art will recognize that any number of different electrically-powered devices may be connected to grid 320. Generally speaking, the power generation facility provides power to the grid and the electrical consumers consume the power, as illustrated by the directionality of arrows 311, 331, 341, 351, and 361, respectively. Note that, in some cases, different entities may manage the power generation facility and the grid (e.g., a power generation facility operator and a grid operator) and in other cases the same entity will manage both the power generation facility and the grid.

In the example shown in FIG. 3, the power generation facility 310 is shown with corresponding energy sources 312, 313, and 314, which include renewable energy generators 312 (e.g., wind, solar, hydroelectric), fossil fuel generators 313, and energy storage devices 314. Like the power generation facility, the server installation 100 may also have energy sources 362, 363, and 364 shown as renewable energy generators 362, fossil fuel generators 363, and energy storage devices 364. Note that the power generation facility and server installation do not necessarily have the same energy sources, e.g., in some cases, the power generation facility may lack fossil fuel generators and the server installation may lack renewable energy generators or vice versa, as well as various other combinations of power generating/storage equipment. Furthermore, either the power generation facility and/or server installation may have other energy sources not shown (e.g., nuclear, fuel cells, etc.).

For the purposes of this document, the term "energy source" encompasses generators, energy storage devices, or other mechanisms that can be used to obtain energy. The term "generator" can also refer to any power generation mechanism and also includes generators powered by renewable technologies, nuclear technologies, fuel cells, etc. The term "energy storage device" encompasses technologies such as electrochemical batteries, capacitors, mechanical energy storage (e.g., water pumped to a given elevation, compressed air, etc.), thermal storage, or other technologies.

In some specific implementations, the energy storage devices are electrochemical batteries provided that can be charged by sources including fossil fuel generators 313 and 363, which can be powered by diesel, natural gas, etc. In some cases, batteries or other energy storage devices may be provided in uninterruptible power supplies used to power various servers. Note also that the terms charging and discharging as used herein generally means adding stored energy to or removing stored energy from an energy storage device, and is not limited to merely charging of electrochemical batteries. For example, charging may encompass moving water from a lower elevation to a higher elevation, adding thermal energy to a thermal energy source, etc.

As mentioned, electricity is typically viewed as a fungible resource, e.g., electrical power provided to one computing device in server installation 100 can just as readily be used by a different computing device in server installation 100. Thus, traditional techniques for providing electricity may not draw a distinction between different computing devices or different power sources used to power the computing devices. In some disclosed implementations, modulated characteristics of electricity are used to facilitate monitoring and controlling how the electricity is consumed by various computing devices. In some cases, different modulated characteristics of electricity are assigned to different sources of electrical power. In other cases, different modulated characteristics of electricity are assigned to different computing devices.

In further implementations, electricity can be modulated to maintain separate sources of power for various reasons. In some cases, renewably-sourced "green" power from renewable energy sources 312 (wind, solar, hydroelectric, etc.) and/or 362 is provided at a first frequency and "brown" power from fossil fuel generators 313 and/or 363 is provided at a second frequency. One specific instance where this can be useful is when regulatory requirements dictate that certain consumers (e.g., in certain jurisdictions) use renewable power. By modulating green power at a different frequency than brown power, a remote grid many miles away from these consumers can send green power to the local grid. Thus, as long as those consumers are using electrical equipment configured to draw power at the correct frequency, they can comply with the regulatory requirements irrespective of whether their local grid is also providing brown power to other consumers.

In other cases, energy produced locally by server installation 100 using any of energy sources 362, 363, and 364 is provided at a first frequency and energy drawn from the grid 320 is provided at a second frequency. This can be useful for separately tracking and managing usage of energy from the grid and usage of energy produced by the server installation. In further implementations, individual computing devices can be assigned different time slices for drawing power produced locally at the server installation or drawn from the grid.

Scenario 300 can also involve a power management system 370 that generally manages and/or controls individual computing devices in server installation 100. The power management system 370 may provide power management functionality by performing any of the methods discussed herein using processing resources 371, memory resources 372, and power management module 373. For example, the power management system may control the amount of energy or power consumed at any given time by any of the computing devices in the server installation. This can be implemented by communicating directly with the servers or associated electrical hardware over network 380.

In some cases, the power management system can be located inside the server installation and network 380 can be an internal server installation network (e.g., implementations where the server installation operator controls the power management system). In other cases, the power management system is remote from the server installation and the network 380 can include a wide area network (e.g., implementations where another entity controls the power management system, such as a utility or grid operator). Also, note that the processing resources and memory resources are discussed in more detail below in the section entitled "Computing Hardware Implementations."

Frequency Modulation Example

Figure 4:
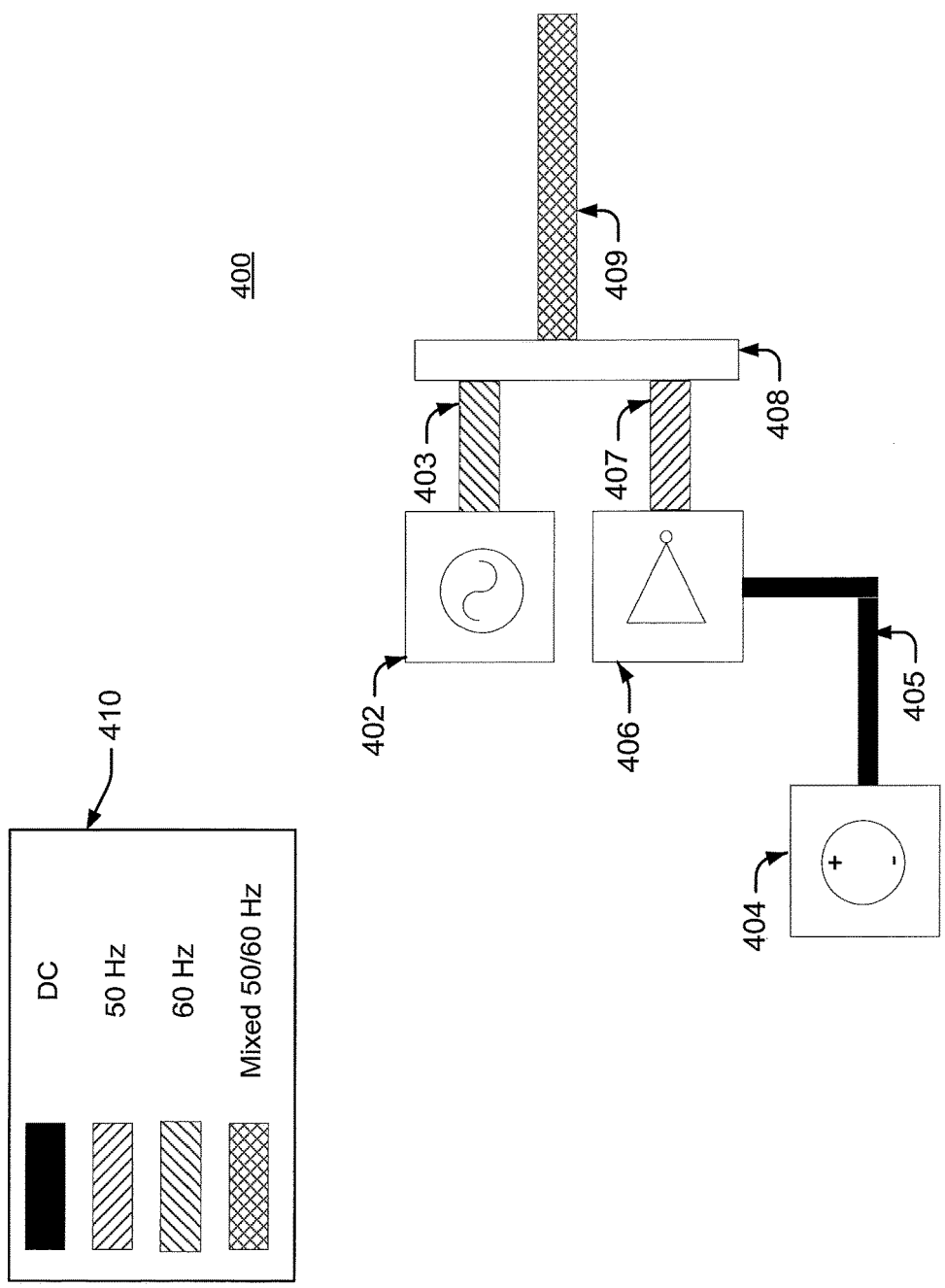
FIGS. 4 and 11 illustrate exemplary circuits consistent with some implementations of the present concepts.

As noted above, one characteristic of electricity that can be modulated for power management of computing devices is frequency. FIG. 4 shows an example frequency modulation circuit 400 that can be used to modulate different alternating current frequencies, e.g., obtained from different power sources. Circuit 400 includes an AC power source 402, DC power source 404, inverter 406, and frequency combining mechanism 408. As discussed more below, different computing devices can be configured to run off of different alternating current frequencies, e.g., 50 Hz for certain computing devices and 60 Hz for other computing devices. Legend 410 shows different patterns used to represent different types of electrical current, as discussed more below.

AC power source 402 can generate alternating current at a first frequency, e.g., 60 Hz, and transmit the alternating current over an electrical line 403 to the frequency combining mechanism 408. DC power source 404 can generate direct current power and transmit the direct current power over an electrical line 405 to an inverter 406. Inverter 406 can convert the direct current power to an alternating current at a different frequency, e.g., 50 Hz, and transmit the 50 Hz alternating current over an electrical line 407 to the frequency combining mechanism 408. The frequency combining mechanism can combine the 50 Hz alternating current from electrical line 407 with the 60 Hz alternating current from electrical line 403 to provide a mixed frequency alternating current over electrical line 409.

As shown in legend 410, FIG. 4 represents direct current as shown on electrical line 405 using black, 50 Hz alternating current as shown on electrical line 407 using a backslash pattern, 60 Hz alternating current as shown on electrical line 403 using a forward slash pattern, and mixed alternating current as shown on electrical line 409 using a crosshatched pattern.

Also, note that FIG. 4 shows only one example of many different types of circuits that can be used to implement the frequency modulation techniques discussed herein. For example, some implementations may use multiple alternating current generators to directly obtain multiple alternating current frequencies (e.g., a 50 Hz and a 60 Hz generator) instead of inverting direct current to obtain individual frequencies. Note that some circuit protection techniques might be useful to prevent generators of different frequencies from potentially damaging one another. As another example, a single DC voltage source could be modulated into multiple frequencies using multiple inverters or different DC voltage sources could be modulated into different AC frequencies. A utility or server installation might choose to modulate DC current produced by wind-powered generators into 70 Hz alternating current and to modulate DC current produced by photovoltaic cells into 50 Hz alternating current, for example.

In some implementations, frequency combining mechanism 408 can simply be a junction of electrical lines 403 and 407, e.g., a splice or other mechanical connection. In further implementations, the frequency combining mechanism can include circuit components to protect equipment on electrical lines 403 and 407. For example, the frequency combining mechanism can include a filter to attenuate 50 Hz current that might feed back onto electrical line 403 to protect AC power source 402 and/or another filter to attenuate 60 Hz current that might feed back onto electrical line 407 to protect DC power source 404 and/or inverter 406. Relays, circuit breakers, fuses, and other circuit protection devices can also be used to protect the power generating equipment. In some cases, these circuit protection devices can be configured to trigger on over/under frequency conditions, and can also be used to detect reverse power conditions, overcurrent conditions, etc.

In addition, the frequency combining mechanism 408 can, in some cases, be involved in generating different frequencies that are placed onto electrical line 409. For example, the frequency combining mechanism can be implemented as a frequency mixer. For example, suppose green energy is obtained at 60 Hz. To distinguish the green energy from the brown energy at 60 Hz, the green energy can be mixed with 10 Hz power to obtain 50 Hz and 70 Hz current before placing the green energy on electrical line 509. Thus, the green energy on electrical line 509 is at 50 Hz and 70 Hz and distinguishable from 60 Hz brown energy, even though the green energy was originally obtained at the same frequency (60 Hz) as the brown energy.

Note that the disclosed techniques can be performed in many different scenarios and using many different techniques for modulating electricity. For example, implementations may use waveform correction circuits, motor generator systems, or other techniques to modulate electricity. In addition, some implementations may employ a microcontroller, microprocessor, ASIC, and/or FPGA to implement various actions at the frequency combining mechanism, e.g., filtering and/or throttling different frequencies as discussed elsewhere herein.

The frequency combining mechanism 408 can also include a meter to track power consumption of different frequencies. Note also that a meter configured to track usage of multiple frequencies can also be deployed anywhere in frequency modulation circuit 400 where mixed frequency alternating current is present, e.g., electrical line 409. Alternatively, separate meters configured to track usage of a single frequency can be deployed wherever electrical current predominantly has one frequency, e.g., electrical lines 403 and/or 407 or elsewhere as described herein.

Also, note that filtering of a given frequency may not necessarily remove all of that frequency from a given electrical line. Generally, a computing device configured to operate on a first frequency may tolerate receiving a certain amount of other frequencies as well. For the purposes of this document, a filter may be described as providing alternating current of "predominantly" a specific frequency. This means that other frequencies have been removed from the modulated electricity to a sufficient extent that computing devices configured to operate on the specific frequency can do so relatively safely, e.g., that other frequencies remaining after the filtering are unlikely to cause damage.

Similarly, mixed frequency alternating current may have various frequencies included therein that are not necessarily intended or used for powering computing devices. For example, an electrical line carrying 50 Hz and 60 Hz current may carry harmonics, noise, and/or spurious signals and thus may have various frequency components other than the 50 Hz and 60 Hz alternating current. For the purposes of this document, an electrical line that "predominantly" carries mixed frequency alternating current means that the mixed frequency alternating current can be separated (e.g., by filtering) into at least two distinct frequency components and each distinct frequency component can be used for powering one or more computing devices on a continuous or intermittent basis. An electrical line predominantly carrying a single frequency or multiple frequencies of alternating current may nevertheless include other frequency components such as the aforementioned harmonics, spurious signals, and/or noise.

Grid-Provided Multi-Frequency Example Using Server Batteries

Figure 5:
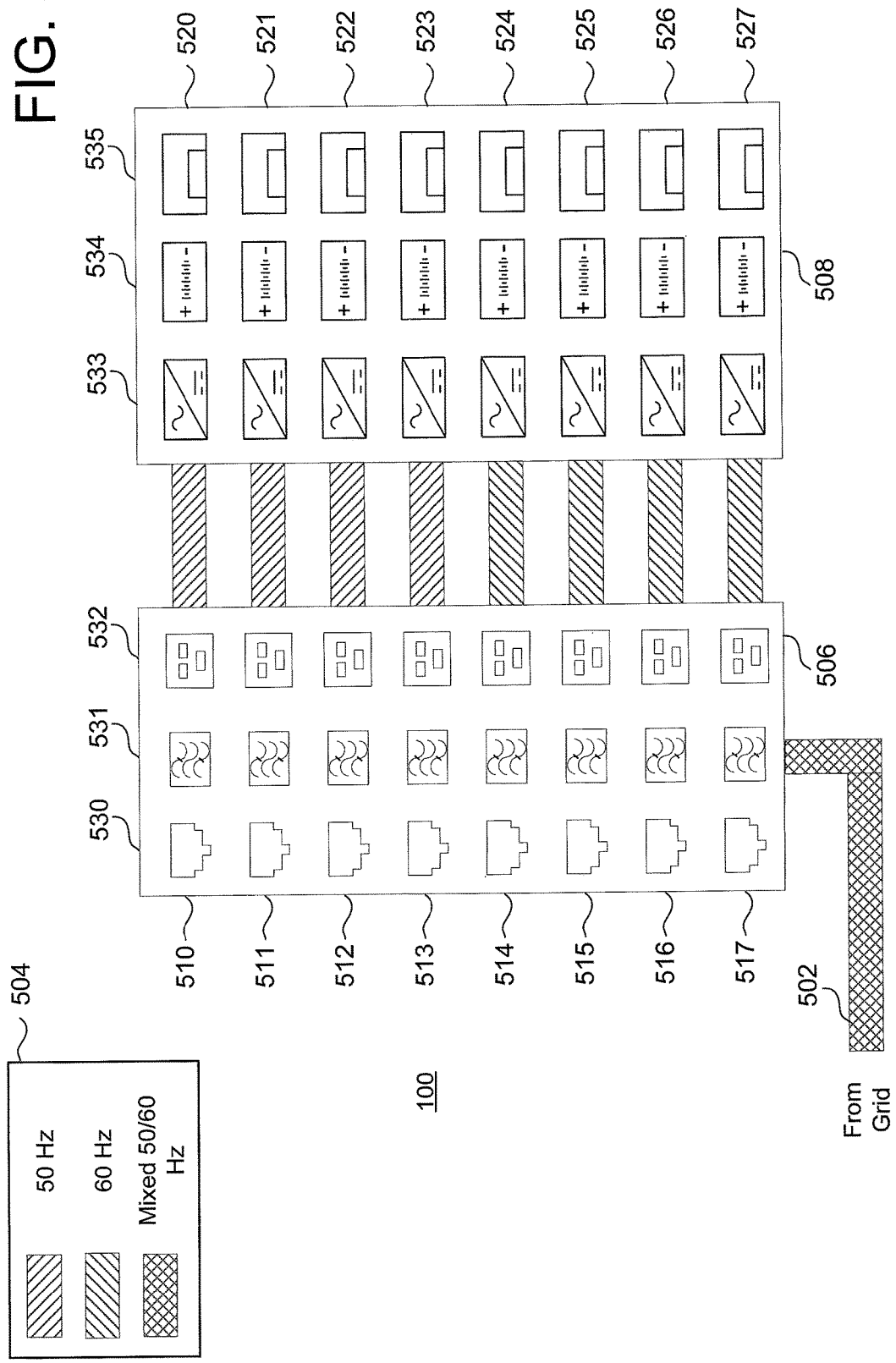
FIGS. 5-8 illustrate example server installation scenarios consistent with some implementations of the present concepts.

FIG. 5 illustrates a configuration of server installation 100 where the grid 320 provides electricity having multiple alternating current frequencies to server installation 100 over an electrical line 502. For example, the power generation facility 310 (FIG. 3) might implement the frequency generation circuit 400 (FIG. 4) by using renewable generator 312 as the DC source 404 (modulated to 50 Hz) and fossil fuel generator 313 as the AC source 402 (generated at 60 Hz). The server installation 100 can receive mixed 50 and 60 Hz current from the grid over electrical line 502. Legend 504 shows patterns representing various types of electricity.

The mixed alternating current received from the grid can generally be routed by a power distribution unit 506 to a server chassis 508. Power distribution unit 506 can include network ports 530, filters 531, and power outlets 532. Server chassis 508 can include rectifiers 533, batteries 534, and computing devices 535. Generally, the components of the power distribution unit can be arranged in corresponding power distribution unit sets 510, 511, 512, 513, 514, 515, and 516, and the components of the server chassis can be arranged in corresponding server chassis sets 520, 521, 522, 523, 524, 525, 526, and 527.

The network ports 530 in the power distribution unit 506 can have internet protocol (IP) addresses and be configured to control the corresponding filters 531 and/or outlets 532. Filters 531 can filter out certain frequencies of alternating current to provide filtered alternating current to corresponding components in the server chassis 508. For example, the rectifiers 533 in the server chassis 508 can be configured to run on either 50 Hz (e.g., rectifiers in server chassis sets 520, 521, 522, and 523) or 60 Hz current (e.g., rectifiers in server chassis sets 524, 525, 526, and 527). Thus, the filters in power distribution sets 510, 511, 512, and 513 can attenuate or remove frequencies other than 50 Hz (e.g., 60 Hz) and the filters in power distribution sets 514, 515, 516, and 517 can be configured to attenuate or remove frequencies other than 60 Hz (e.g., 50 Hz). The rectifiers 533 can output corresponding DC current to the batteries 534. Each computing device 535 can operate by drawing DC current from batteries 534 and/or directly from the corresponding rectifier. Note that while FIG. 5 generally shows one-to-one relationships between the computing devices, batteries, rectifiers, outlets, and filters, further implementations may have one to many or many to many relationships between these components.

In the implementation shown in FIG. 5, the computing devices 535 in server chassis sets 520, 521, 522, and 523 can be configured as "green" computing devices and are powered using 50 Hz power (e.g., green) and the computing devices in the server chassis sets 524, 525, 526, and 527 can be configured as "brown" computing devices and are powered using 60 Hz (e.g., brown) power. Thus, for example, one can request a "green" computing job from the server installation 100 and the green job can be assigned to a green computing device, or one can request a brown job and the brown job can be assigned to a brown computing device. Because the green and brown power are provided in different frequencies, abstract mechanisms such as financially accounting for green energy purchases are not needed to provide green computing functionality. Moreover, one can prove that a given job was performed using green energy by demonstrating that the job was performed on a computing device powered by a circuit that is configured for a frequency dedicated to green energy (e.g., 50 Hz).

Server Installation-Provided Multi-Frequency Example Using Server Batteries

Figure 6:
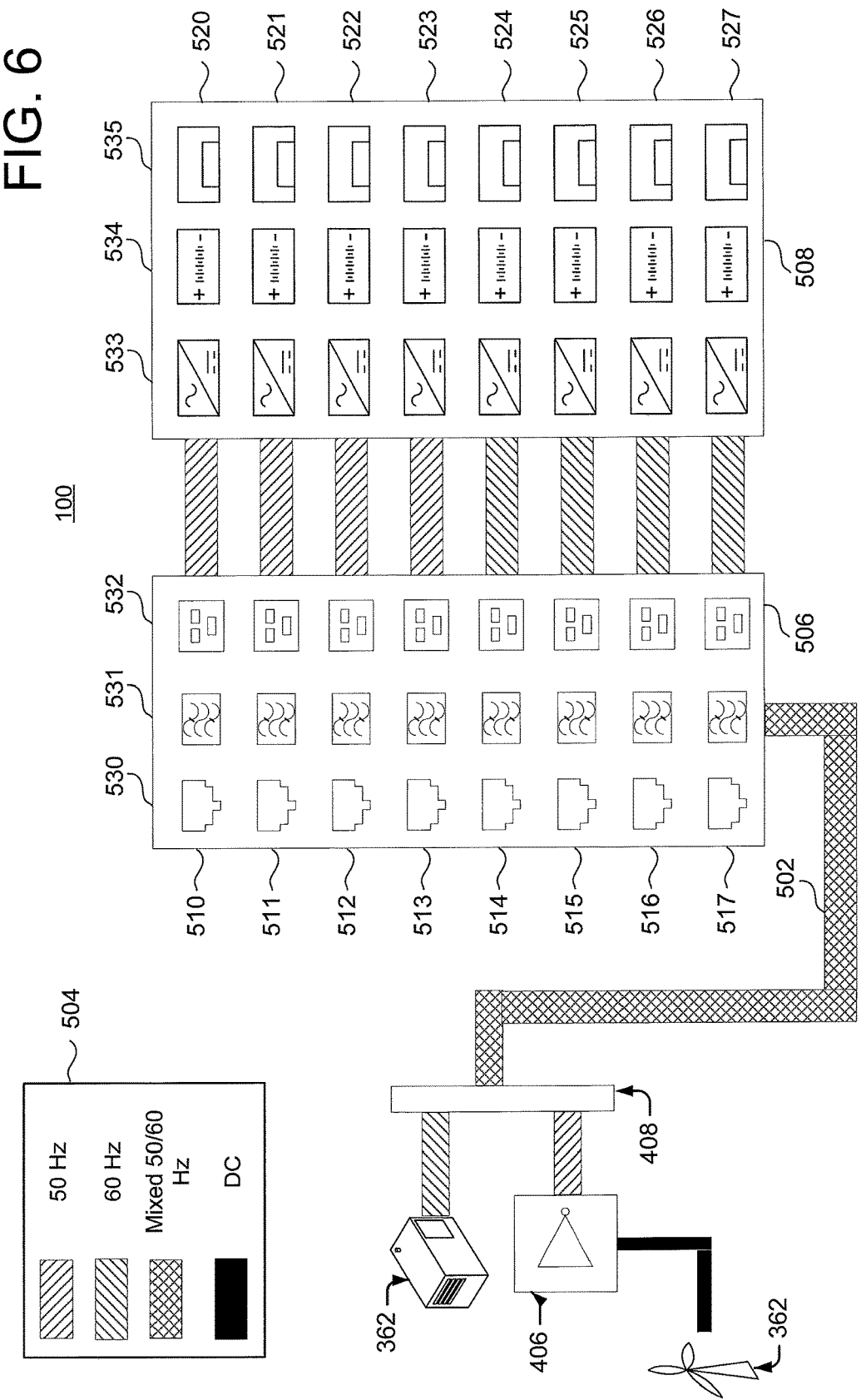

FIG. 6 illustrates a configuration of the server installation 100 similar to that set forth above with respect to FIG. 5, except where the server installation generates its own renewable and fossil fuel electricity. In this case, the frequency modulation circuit 500 can be implemented at the server installation. The server installation can also include power distribution unit 506 and server chassis 508, which operate similar to the manner discussed above with respect to FIG. 5.

In this example, the fossil fuel generator 362 (FIG. 3) of the server installation servers as the alternating current source 402 of the frequency modulation circuit 400 (FIG. 4). In addition, the renewable generator 363 serves as the direct current source 404 of the frequency modulation circuit. Thus, like the example set forth above with respect to FIG. 5, the server installation can provide provably-green computing jobs without using abstract financial accounting mechanisms to substantiate the energy source used to power the computing devices that perform the job.

Multi-Frequency Example Using Grid-Powered Uninterruptible Power Supply

Figure 7:
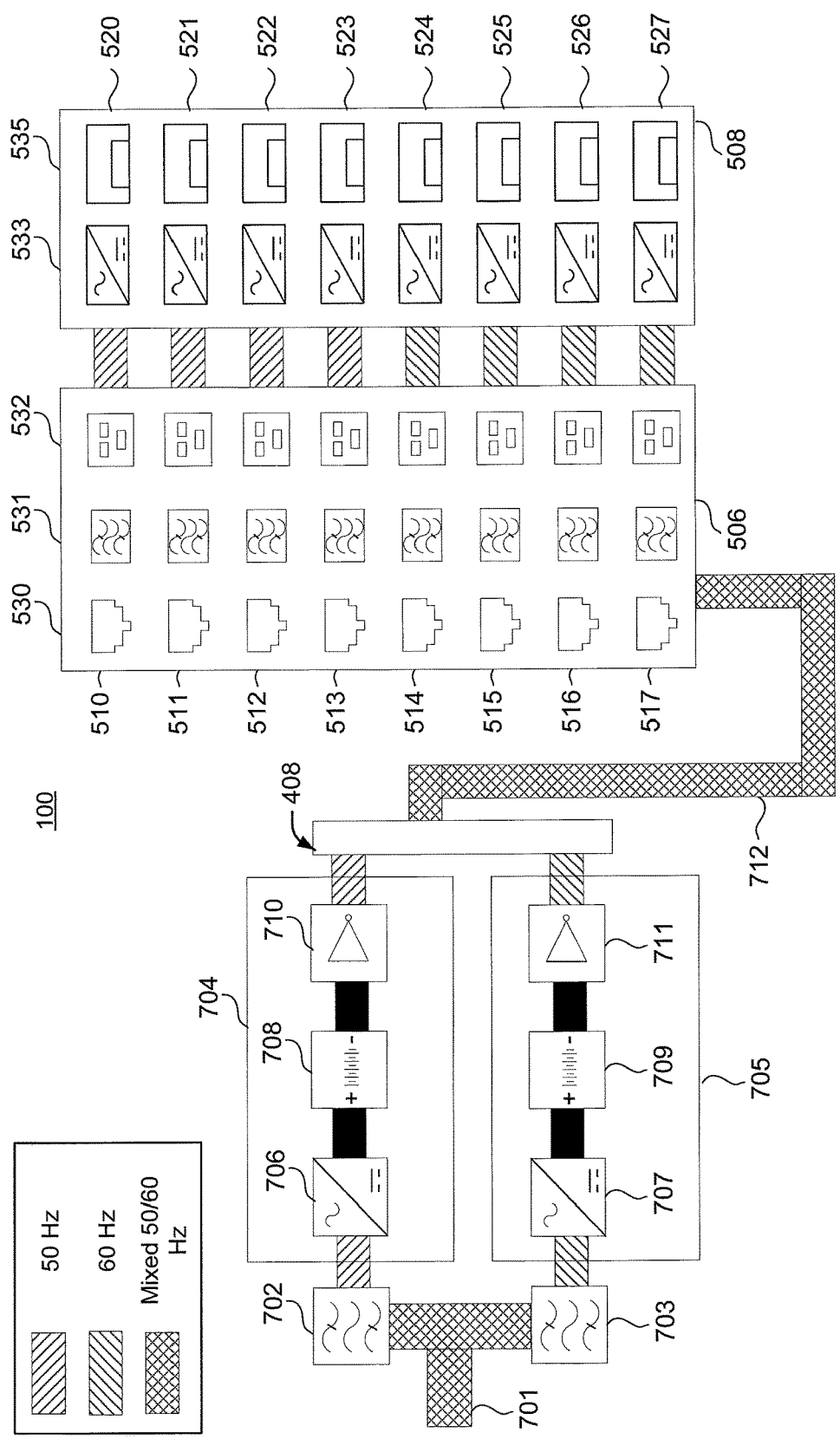

In the previous examples, individual computing devices or groups of computing devices were provided with local energy storage, e.g., local batteries. FIG. 7 shows a configuration of the server installation 100 using uninterruptible power supplies. Either grid 320 or server installation 100 provides mixed frequency alternating current on electrical line 701. Generally, the mixed frequency alternating current is provided to two filters 702 and 703 and corresponding uninterruptible power supplies 704 and 705. The uninterruptible power supplies generally store energy used to operate individual computing devices 535 in the server chassis 508, as discussed more below.

In this example, the frequency received from the grid 320 or generated by the server installation 100 includes 50 Hz current produced by renewable energy sources and 60 Hz current produced by fossil fuel sources. Uninterruptible power supply 704 is generally configured to draw green 50 Hz power and output 50 Hz green power, and uninterruptible power supply 705 is generally configured to draw 60 Hz brown power and output 60 Hz brown power.

Filter 702 can attenuate or remove 60 Hz current from the mixed frequency current received over electrical line 701 to obtain predominantly 50 Hz current. This filtered current is received by the rectifier 706 and converted to DC power, which is used to charge battery 708. As computing devices 535 in server chassis sets 520, 521, 522, and 523 draw power, battery 708 is discharged to power these computing devices. More specifically, inverter 710 inverts direct current from battery 708 into 50 Hz alternating current that is subsequently used by these computing devices.

In a similar manner, filter 703 can attenuate or remove 50 Hz current from the mixed frequency current received over electrical line 701 to obtain predominantly 60 Hz current.

This filtered current is received by the rectifier 707 and converted to DC power, which is used to charge battery 709. As computing devices 535 in server chassis sets 524, 525, 526, and 527 draw power, battery 709 is discharged to power these computing devices. More specifically, inverter 711 inverts direct current from battery 709 into 60 Hz alternating current that is subsequently used by these computing devices.

Frequency combining mechanism 408 can combine the 50 Hz output of uninterruptible power supply 704 and the 60 Hz output of the uninterruptible power supply onto electrical line 712. Then, this mixed alternating frequency current can be provided to individual computing devices via power distribution unit 506 and server chassis 508. Note that this example omits the batteries 534 from the server chassis, as the uninterruptible power supplies can serve as energy storage for the computing devices. However, further implementations can use both uninterruptible power supplies as well as local batteries in the chassis.

In the example of FIG. 7, the inverters 710 and 711 inverted direct current back to the same frequency that was used to power the corresponding rectifiers 706 and 707, respectively. However, this is not necessarily the case. More generally, as long as the alternating current from inverters 710 and 711 has some distinguishing characteristics that maintain the distinction between the different frequencies of power received from the grid, then the different frequencies of power can be managed and/or tracked correctly. For example, inverter 710 could invert the DC power from battery 708 to 80 Hz and the inverter 711 could invert the DC power from battery 709 to 90 Hz, and the distinction can be maintained by mapping the 50 Hz grid power to the 80 Hz output and the 60 Hz grid power to the 90 Hz output.

Figure 8:
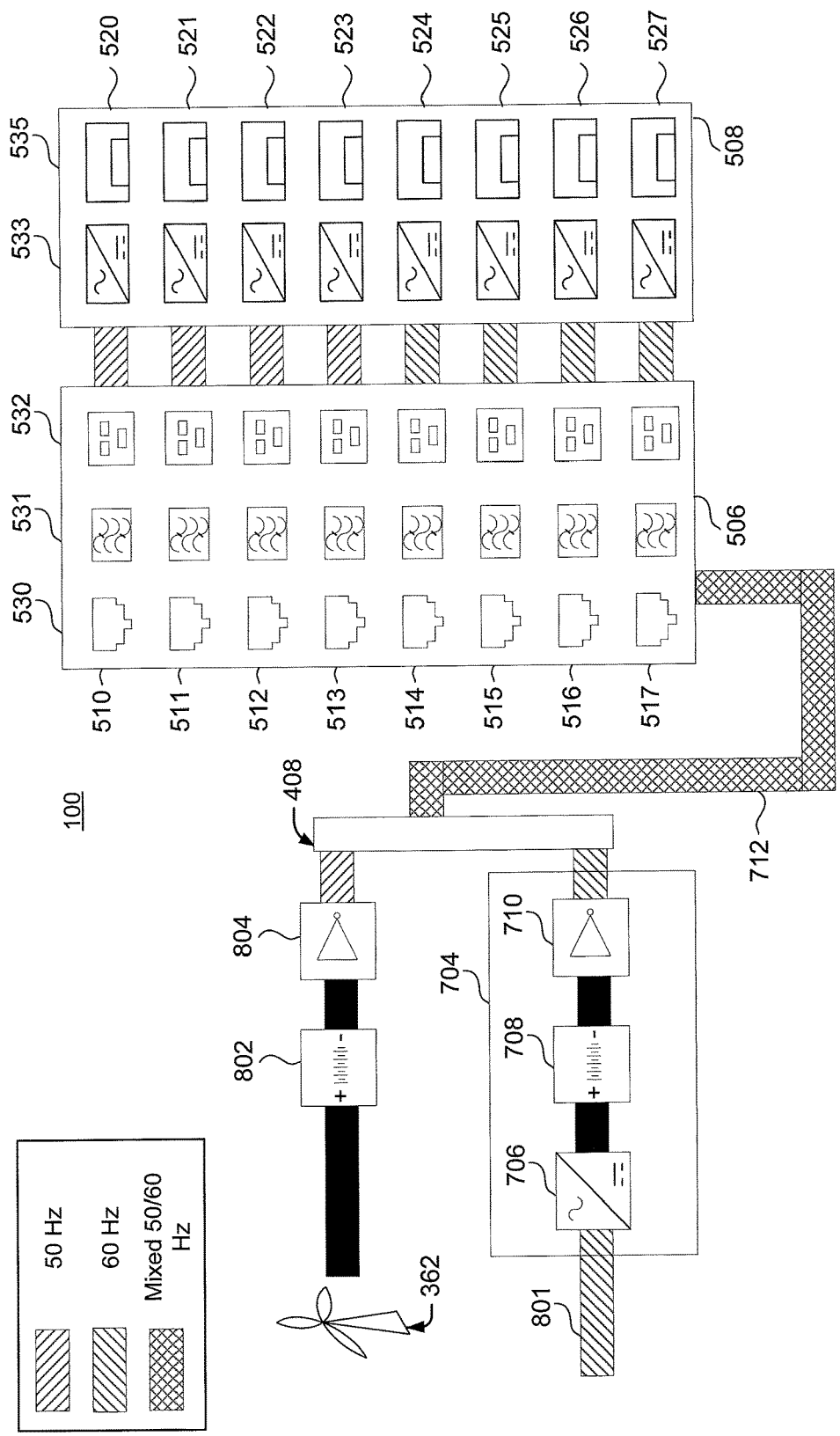

Multi-Frequency Example Using Server Installation-Powered Uninterruptible Power Supply FIG. 8 illustrates an example similar to that set forth above with respect to FIG. 7, except where the server installation generates its own renewable energy and receives brown energy over electrical line 801 from the grid 320. In this case, the renewable energy source 362 of the server installation generates direct current used to charge a battery 802. An inverter 804 can invert direct current from battery 802 into 50 Hz alternating current. This current can be combined with 60 Hz current output by the uninterruptible power supply 704 via the frequency combining mechanism 408. Thus, in this example, the computing devices in server chassis sets 520, 521, 522, and 523 are powered by locally-generated green energy at 50 Hz and the computing devices in server chassis sets 524, 525, 526, and 527 are powered by grid-provided brown energy at 60 Hz. Thus, like the previous examples set forth above, the server installation can provide provably-green computing jobs without using abstract financial accounting mechanisms to substantiate the energy source used to power the computing devices that perform the job.

Frequency Modulation Providing Method

Figure 9:
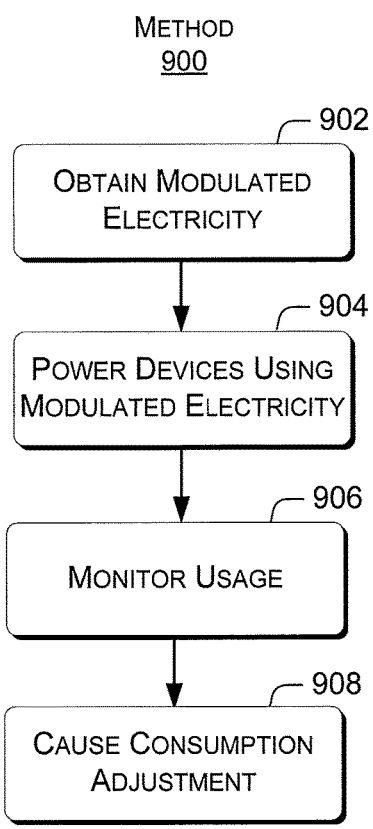

The frequency modulation circuit 400 shown in FIG. 4 and the scenarios shown in FIGS. 5-8 can be used to implement a frequency modulation providing method 900, shown in FIG. 9. Generally speaking, method 900 can be performed in association with providing or generating electrical power, and can be performed by an electrical utility, grid operator, server installation operator, etc. However, the method can also be performed by other entities and in various contexts.

Method 900 begins at block 902, where modulated electricity is obtained. For example, the modulated electricity can include two or more alternating frequency currents. Some power sources, such as fossil fuel generators, may generate alternating current and the frequency of alternating current used by these power sources can be used directly in the generated power. Other power sources, such as many renewable sources (photovoltaic, hydropower, wind power, etc.), may generate direct current. The direct current from these sources can be converted to alternating current, e.g., using an inverter as shown above. As also noted above, the modulated electricity can be generated internally by a server installation or can be received in a modulated form by the server installation.

Method 900 continues at block 904, where multiple different computing devices are powered using the modulated electricity. For example, multi-frequency alternating current can be delivered over an electrical line and/or electrical equipment "shared" by two different computing devices. For the purpose of this document, the term "shared electrical line" or "shared electrical equipment" means any electrical line/equipment used to provide power to at least two different electrical devices (e.g., electrical line 502 in FIG. 5). Note that some implementations may also include electrical lines that predominantly include a particular frequency of alternating current (e.g., after filtering by filters 531).

Method 900 continues at block 906, where usage of the modulated electricity is monitored. For example, in some cases, different alternate frequency currencies are monitored separately. For example, 60 Hz current can be monitored separately from 50 Hz current. In some cases, different capping and pricing mechanisms can also be applied to the different frequencies, as discussed elsewhere herein.

Method 900 continues at block 908, which causes an adjustment to consumption of the modulated electricity. For example, referring back to FIG. 5, the power consumption by any individual computing device 535 can be adjusted by sending an instruction to reduce, stop, or increase the amount of power drawn by this individual computing device. In some cases, the instructions are sent directly to the computing device, and in other cases can be sent to electrical equipment in a circuit that powers the computing device. In some implementations, the instruction is sent to a corresponding network port 530, which can control the power distribution unit to turn off the corresponding outlet 532. In some cases, the instruction is sent over a computer network, and in other cases power line communication techniques are used to send the instruction over one or more of the electrical lines.

Also, note that block 908 can also be implemented without sending any instructions. Rather, this block can involve the grid and/or server installation stopping modulation of a specific frequency. For example, if green energy is scarce or unavailable, the grid and/or server installation can stop modulating 50 Hz electricity. In the example of FIG. 5, block 908 can be implemented by causing the batteries 534 in server chassis sets 520, 521, 522, and 523 to stop charging and eventually cause the corresponding computing device 535 to stop processing. However, the batteries in server chassis sets 524, 525, 526, and 527 could continue to charge via 60 Hz brown power.

More generally, the aforementioned method allows for selectively monitoring and controlling different types of power using different alternating current frequencies. As noted above, some implementations may use one frequency (e.g., 60 Hz) for "brown" or non-renewable power and another frequency (e.g., 50 Hz) for "green" or renewably sourced power. However, other variations are also contemplated. For example, electricity provided by one utility (e.g., in a first geographic location) can be provided at one frequency and electricity provided by a different utility (e.g., in a second geographic location remote from the first location) can be provided at another frequency. This allows both frequencies to be transmitted over existing electrical grids, e.g., across large geographic regions.

As another example, energy charged at a first rate can be provided on a different frequency charged at a second rate. As yet another example, electricity generated within a server installation can be generated at a first frequency and externally-generated (e.g., grid-sourced) energy can be generated at a second frequency, irrespective of whether the electricity is generated by renewable sources. These techniques can also be combined, e.g., green energy from the grid can be provided at a first frequency (e.g., 50 Hz), brown energy from the grid can be provided at a second frequency (e.g., 60 Hz), green energy generated by the server installation can be provided at a third frequency (e.g., 70 Hz), and brown energy generated by the server installation can be provided at a fourth frequency (e.g., 80 Hz). In further implementations, each computing device can have a specific assigned frequency, e.g., a server rack could have 42 different computing devices and modulate power to the 42 computing devices using 42 different frequencies.

Frequency Modulation Consumption Method

Figure 10:
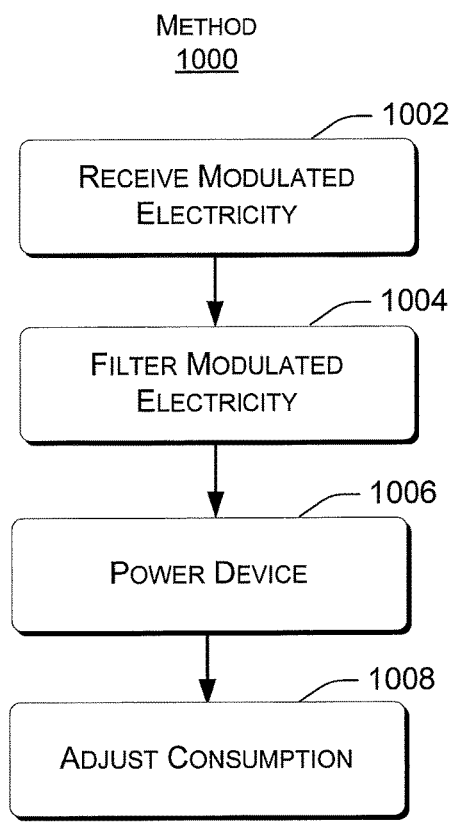

The frequency modulation circuit 400 shown in FIG. 4 and the scenarios shown in FIGS. 5-8 can also be used to implement a frequency modulation consumption method 1000, shown in FIG. 10. Generally speaking, method 1000 can be performed in association with consuming electrical power, and can be performed by an electricity consuming device such as a computing device or by electrical equipment that provides power to the computing device. However, the method can also be performed by other entities and in various contexts.

Method 1000 begins at block 1002, where modulated electricity is received. For example, the modulated electricity can be mixed frequency alternating current. As noted, the mixed frequency alternating current can be received over a single electrical line.

Method 1000 continues at block 1004, where the modulated electricity is filtered to provide filtered electrical power. For example, the mixed frequency alternating current can be filtered to provide alternating current that predominantly contains a first alternating current frequency by attenuating or removing a second alternating current frequency.

Method 1000 continues at block 1006, where a computing device is powered with the filtered electrical power. For example, the filtered electrical power can be converted to direct current and the computing device can be powered by the direct current.

Method 1000 continues at block 1008, where power or energy consumption by the computing device is adjusted. For example, an instruction to reduce, halt, or increase consumption of electrical power can be received. In some cases, the instruction is received by the computing device being powered, and in other cases is received by another device such as a power distribution unit or individual item of electrical hardware (e.g., a filter, switch, etc.). In still further implementations, the power or energy consumption is automatically adjusted when alternating current at the first alternating current frequency is no longer being modulated by the electricity provider (e.g., grid and/or server installation).

Generally, method 1000 can serve as a counterpart to method 900. For example, assume renewable energy sources are provided at 50 Hz and fossil fuel sources are provided at 60 Hz. Further assume renewable sources are strained, e.g., due to excessive demand, weather conditions that limit renewable energy generation (e.g., cloud cover), etc. Instructions can be sent to disable computing devices that draw from the 50 Hz source of electricity while continuing to allow the computing devices powered by 60 Hz to run.

Also note that method 1000 can be performed for multiple computing devices. For example, block 1004 can include filtering the mixed frequency alternating current using two different filters. A first filter can provide alternating current that predominantly contains a first alternating current frequency by attenuating or removing a second alternating current frequency, and the second filter can provide alternating current that predominantly contains the second alternating current frequency by attenuating or removing the first alternating current frequency. Block 1006 can include powering the first and second computing devices with different electrical lines and/or equipment carrying corresponding filtered alternating frequency current. Said differently, the electricity received by the filters is predominantly mixed alternating frequency current and the electricity used to power the individual computing devices is predominantly of the correct alternating frequency current used to power those computing devices. In some cases, rectifiers are provided that operate on specific alternating current frequencies received via the corresponding filters, and direct current output by the rectifiers is used to power the individual computing devices.

Also, note that other mechanisms can be used to adjust consumption of electricity at a given frequency. For example, some implementations configure individual filters to remove specific types of electricity. In some cases, the power distribution unit 506 is provided with selectable filters. For example, at certain times, a first set of filters could be activated to remove 60 Hz brown power and run each of the server computing devices using only 50 Hz green power. At other times, another set of filters could be activated to remove 50 Hz green power and run each of the server computing devices using only 60 Hz brown power. Such implementations may also use two rectifiers for each server battery, e.g., a 50 Hz rectifier and a 60 Hz rectifier, or may use a single rectifier capable of operating on both 50 Hz and 60 Hz current.

Frequency Waveform Characteristics

Generally, multiple alternating frequencies can be transmitted over a given electrical line by summing the individual waveforms. In an extreme case, an impulse or square wave signal having a multitude of different frequency components can be placed on an electrical line and appropriate filters used to extract these frequency components on the consumption side.

The specific filters used can depend on how different frequencies are used. For example, in the case where there are only two frequencies on a given line, a high pass filter (e.g., filtering out frequencies below 55 Hz) could be used for a 60 Hz device and a low pass filter (e.g., filtering out frequencies above 55 Hz) could be used for a 50 Hz device. In further implementations, bandpass filters can be used, e.g., a 50 Hz device could have a 49-51 Hz bandpass filter to run on 50 Hz current, a 55 Hz device could have a 54-56 Hz bandpass filter to run on 55 Hz current, and a 60 Hz device could have a 59-61 Hz bandpass filter to run on 60 Hz current, all sharing a given electrical circuit.

Because a single electrical line can carry electricity with different modulated characteristics, a significant amount of existing infrastructure can be reused. For example, existing transmission and distribution lines on the grid as well as facility wiring in a server installation may be capable of carrying mixed frequency alternating current as described herein. In some cases, green energy sourced at one location (e.g., California) can be transmitted over very long distances (e.g., to Maryland). This would allow a server installation in Maryland to distinguish between green energy delivered from California and local brown energy because the different sources have different corresponding frequencies.

Temporal Modulation Example

Figure 11:
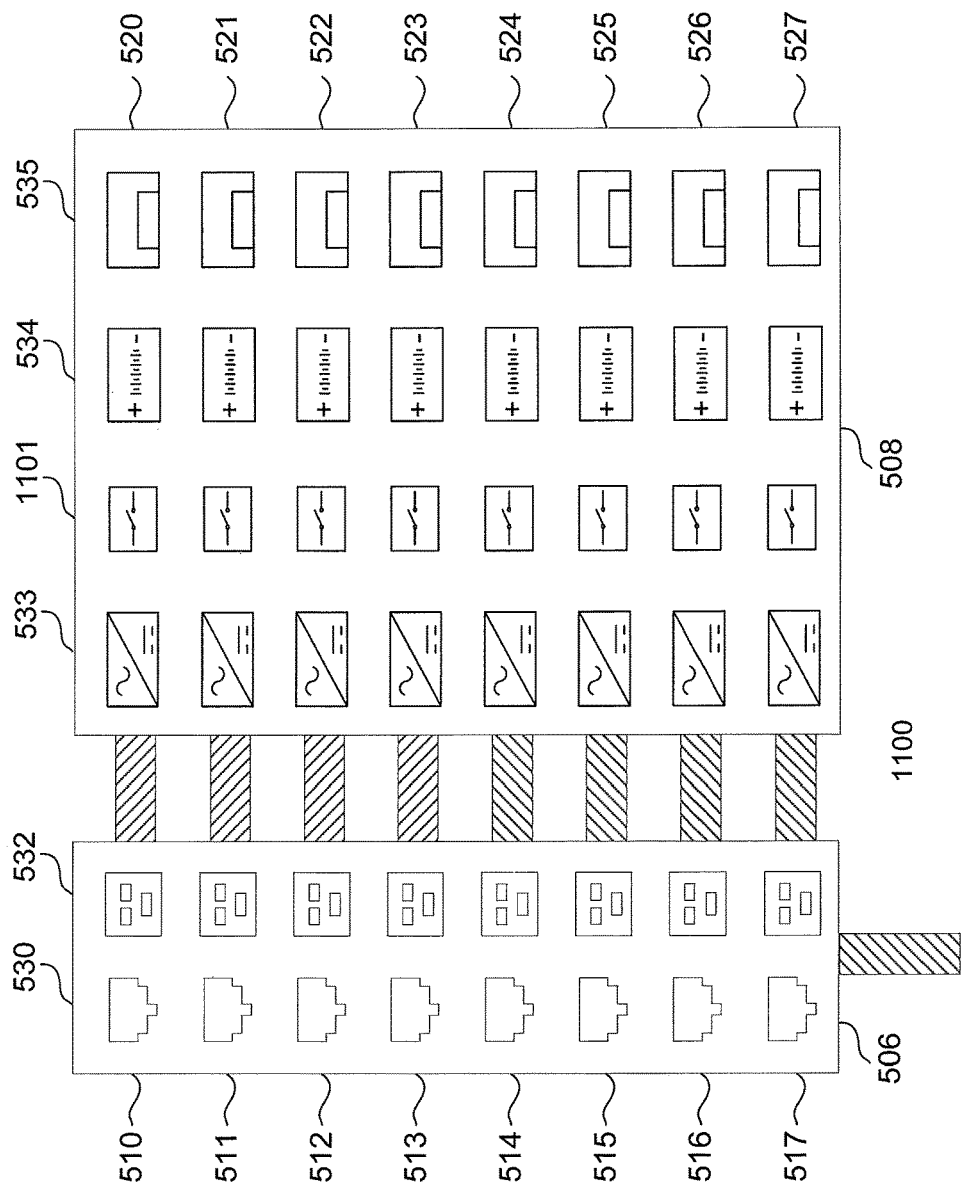

FIG. 11 shows an example circuit 1100 that can be used for temporal modulation of electricity, and can be implemented inside server installation 100. In this case, alternating current can be provided to the power distribution unit 506 using any of the techniques discussed herein. The server chassis 508 can be configured with batteries 534 as discussed above, as well as with switches 1101. Each switch can correspond to a particular battery and computing device. For example, when the switch in the server chassis set 520 is closed, the direct current produced by the corresponding rectifier 533 in server chassis set 520 can be used to charge the corresponding battery 534. When this switch is open the corresponding battery in server chassis set 520 is not charged. Likewise, when the switch in the server chassis set 521 is closed, the direct current produced by the corresponding rectifier 533 in this server chassis set can be used to charge the corresponding battery 534. When this switch is open, the battery in server chassis set 521 is not charged. The other server chassis sets can operate similarly.

The switches 1101 within the server chassis 508 can be controlled via various mechanisms to open and close at various assigned time slices. For example, assume that a first computing device 535 (e.g., in server chassis set 520) is assigned odd time slices and a second computing device 535 (e.g., in server chassis set 521) is assigned even time slices. This allows individual computing devices to have specific times when they can draw power, as discussed more below. Also, note that some implementations may provide one or more sensing mechanisms (not shown) in the circuit 110. The sensing mechanism can be an integrated circuit that senses voltage, frequency, and/or power and digitizes the sensed values for analysis by the power management system 370. For example, the power management system can used these sensed values to determine how much power is being drawn by individual computing devices and to detect whether certain computing devices are drawing power during unassigned time slots. For example, the power management system can compare actual power drawn during various time slices to the amount of power expected to be drawn given the time slice assignments to detect unauthorized usage of power.

Temporal Modulation Providing Method

The temporal modulation circuit 1100 shown in FIG. 11 is one example of a circuit that can be used to implement a temporal modulation providing method 1200, shown in FIG. 12. Like method 900 discussed above with respect to FIG. 9, method 1200 can be performed in association with providing or generating electrical power, and can be performed by an electrical utility, grid operator, server installation operator, etc. However, the method can also be performed by other entities and in various contexts.

Method 1200 begins at block 1202, where time slices are assigned to different computing devices. In the example discussed above, odd and even numbered time slices were used for the purposes of exposition. In some cases, different orthogonal codes can be assigned to individual computing devices. Each code can identify a set of time slices assigned to a given computing device for drawing electricity. Implicitly, the code can identify corresponding other set of time sequences during which the computing device (or associated electrical equipment) is not permitted to draw electricity.

Method 1200 continues at block 1204, where electricity is delivered to multiple different computing devices and/or associated electrical equipment. Generally, the electricity can be delivered as alternating current without any temporal modulation on the power generation side, as the temporal modulation can be performed by consuming devices or electrical equipment.

Method 1200 continues at block 1206, where availability of electrical power is analyzed. For example, there may be times when electrical power provided by the grid and/or server installation is plentiful, and other times when electrical power is scarce.

Method 1200 continues at block 1208, which causes an adjustment to consumption of the electricity. For example, an instruction can be sent to adjust the power consumption of a given computing device and/or associated electrical equipment. Generally speaking, block 1208 of method 1200 can be similar to block 908 of method 900. For example, the power consumption by a given computing device can be adjusted by sending an instruction to reduce, stop, or increase the amount of power drawn by this computing device. In some cases, the instructions are sent directly to the computing device, and in other cases can be sent to another device in the circuit such as a corresponding switch 1101. In some cases, the instruction is sent over a computer network, and in other cases power line communication techniques are used to send the instruction over one or more electrical lines used to power the computing device.

When using temporal modulation, one way to instruct a computing device to reduce its power consumption is to change the time slices assigned to that computing device. For example, a given computing device or associated battery may be drawing, on average, every third time slice and the computing device (or associated switch or other piece of electrical hardware) may be instructed to reduce its consumption to every fourth time slice. In some cases, the instruction can be a binary code, e.g., 1100 can be interpreted as an instruction to draw power in time slices 0 and 1 and not to draw power in time slices 2 and 3.

Temporal Modulation Consumption Method

The temporal modulation circuit 1100 shown in FIG. 11 is also an example of a circuit that can be used to implement a temporal modulation consumption method 1300, shown in FIG. 13. Like method 1000 discussed above with respect to FIG. 10, method 1300 can be performed in association with consuming electrical power, and can be performed by a computing device or by electrical equipment that shares a circuit with the computing device. However, the method can also be performed by other entities and in various contexts.

Method 1300 begins at block 1302, where a time slice assignment is received for a given computing device or associated piece of electrical hardware (e.g., battery, rectifier, filter, switch, etc.) As noted above, the time slice assignment may be represented as a binary string identifying certain time slices in which the computing device or associated electrical hardware is permitted to draw power. As also noted, in some cases the time slice assignments may conform to a coding scheme.

Method 1300 continues at block 1304, where power is selectively drawn during the assigned time slices but not other time slices. For example, switches 1101 can be closed (i.e., present low resistance) during time slices assigned to corresponding computing devices 535 and otherwise open (i.e., present high resistance).

Method 1300 continues at block 1306, where the server computing devices are powered. In some cases, the power drawn at block 1304 is used to charge an energy storage device and block 1306 involves drawing power from the energy storage device.

Method 1300 continues at block 1308, where consumption is adjusted based on a received instruction. For example, the instruction can be to reduce, halt, or increase consumption of electrical power. In some cases, the instruction is received by the computing device being powered and in other cases, can be received by another device such as a corresponding switch 1101. In some cases, the instruction identifies a new time slice pattern or code to be used to power the computing device.

Generally, method 1300 can serve as a counterpart to method 1200. For example, under conditions when electrical resources are strained, e.g., due to excessive demand, weather conditions that limit renewable energy generation (e.g., cloud cover), instructions can be sent to reduce or disable power consumption by certain computing devices while allowing other computing devices to continue drawing full power. As one specific example, computing devices running high-priority jobs can receive full time slice allotments (e.g., sufficient to continue running without slowing down) and other computing devices running low-priority jobs can receive reduced time slice allotments (e.g., the low priority jobs are slowed down or stopped as a result of drawing less power).

Example Time Slice Adjustment

Figure 14:
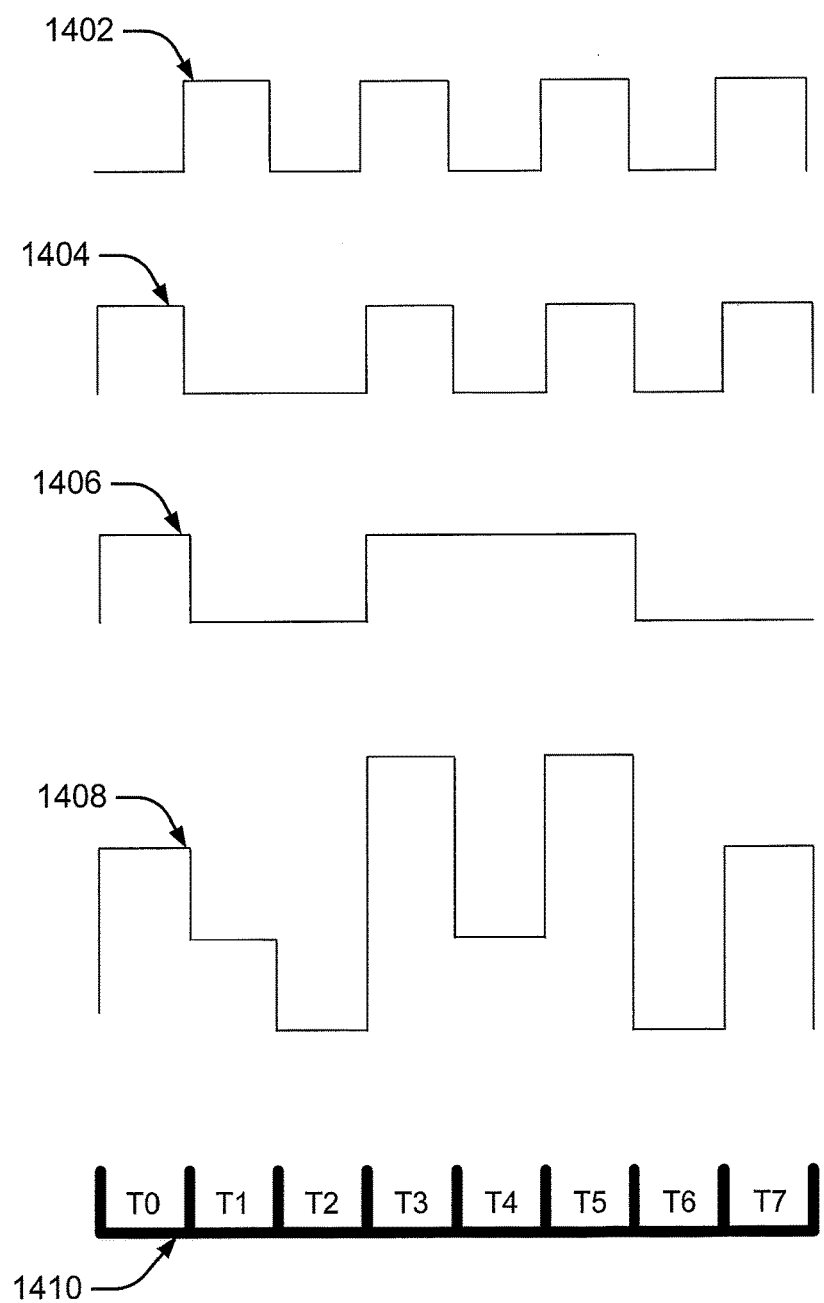
FIGS. 14 and 15 illustrate example temporal modulation characteristics of electricity consistent with some implementations of the present concepts.
Figure 15:
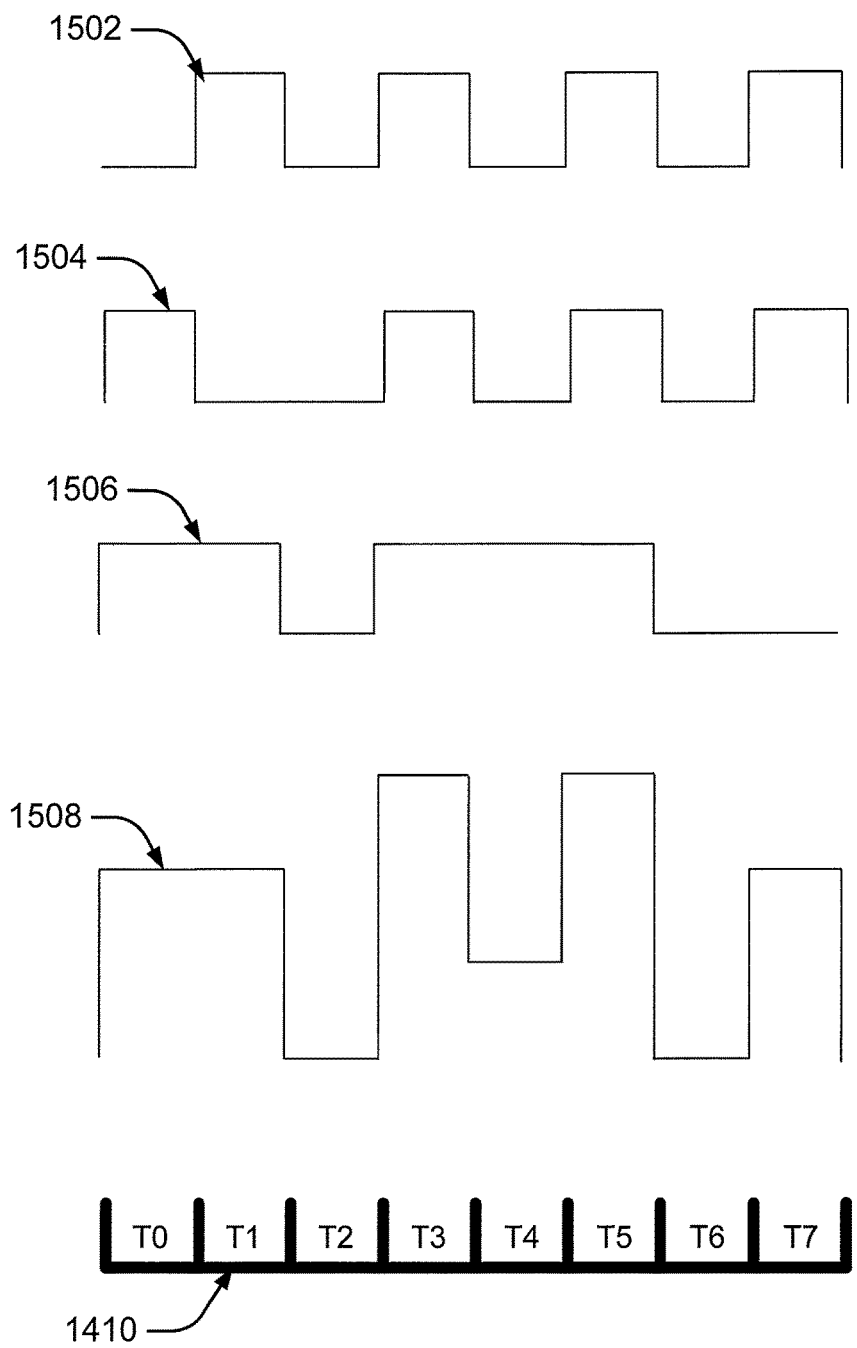

FIGS. 14 and 15 further illustrate how the power management system 370 can adjust usage of power using assigned time slices. Generally speaking, FIG. 14 illustrates a scenario where three computing devices obtain power during specified time slices, and FIG. 15 illustrates another scenario where one of the computing devices is authorized to obtain power during an additional time slice.

FIG. 14 shows a first power consumption pattern 1402, second power consumption pattern 1404, third power consumption pattern 1406, cumulative power consumption pattern 1408, and timeline 1410. Timeline 1410 is shown for reference purposes and shows 8 time slices numbered T0 through T7. First power consumption pattern 1402 shows power consumption during these 8 time slices by a first computing device, second power consumption pattern 1404 shows power consumption during these 8 time slices by a second computing device, and third power consumption pattern 1406 shows power consumption during these 8 time slices by a third computing device. Cumulative power consumption pattern 1408 shows a sum of the power consumption from patterns 1402, 1404, and 1406 in each time slice.

Assume the power management system assigns an additional time slice to the third computing device. Such a scenario is shown in FIG. 15, which includes patterns 1502, 1504, 1506, and 1508 similar to those in FIG. 14. However, note that in FIG. 15, consumption pattern 1506 shows that the third computing device has drawn power during time slice T1, which is newly assigned to this computing device. Thus, the cumulative pattern 1508 shows the additional power draw by this computing device.

Also, some implementations may also perform temporal modulation on the generation side. For example, the power management system 370 may control electrical equipment to manipulate the amount of power placed on the grid or within the server installation during each time slice, e.g., based on a sum of the amount of power expected to be used by each device for each assigned time slice.

Instruction Schemes

In some implementations, the power management system 370 can perform dynamic reconfiguration of computing devices by sending instructions over network 380 to the computing devices or electrical equipment that powers the computing devices. As previously noted, network 380 can be implemented using traditional wired or wireless computing networks and/or power line communication techniques. For example, power management system 370 could send an instruction to a given server computing device, power distribution unit, switch, etc., over an electrical connection, a wired computer networking connection, a wireless computer networking combination, or a combination thereof. In cases where power line communication techniques are used, these can be employed entirely within the server installation and can also be employed by sending power line communications across the grid.

For example, in frequency modulation schemes, the power management system 370 might instruct switches connected to 50 Hz equipment to open while leaving switches connected to 60 Hz equipment closed. Alternatively and/or in addition, the power management system might instruct a given power source to stop producing power and/or instruct a given inverter to stop modulating power to a particular frequency.

In temporal modulation schemes, the power management system 370 might instruct some sets of electrical equipment to reduce the charging rate of their batteries by drawing from fewer time slices (e.g., from drawing on 33% of time slices to 20% of time slices). The power management system might allow other electrical equipment to continue drawing at the same rate. Referring to FIG. 11, server chassis sets 520 and 521 might include computing devices running low priority jobs and can be instructed to reduce the charging rate of the corresponding batteries in these server chassis sets. On the other hand, server chassis sets 526 and 527 might include computing devices running high priority jobs and may continue to draw power every third time slice.

In some cases, individual computing devices or associated electrical equipment can have assigned identifiers (e.g., addresses) that are sent over the network 380. In the case of power line communication, coding techniques can be applied to the electrical current so that the electrical current carries the instructions and/or identifiers thereon. In some cases, units of electrical energy can be "packetized" by designating certain units of electrical energy for certain consuming devices. For example, a first packet could authorize three computing devices and/or associated electrical equipment to implement the current drawing patterns shown in FIG. 14 for a first 8 time slices, and then a second packet could authorize the three computing devices and/or associated electrical equipment to implement the current drawing patterns shown in FIG. 15. In other words, two consecutive packets could authorize otherwise-identical drawing patterns but authorize an additional time slice (T1) in the second packet. More generally, each packet identifies a specific quantity of energy that is authorized to be drawn over two separate time intervals of 8 time slices each.

In some cases, instructions in both frequency and temporal modulation schemes identify groups of computing devices instead of individual devices. For example, an instruction could cause a switch to stop supplying power to a specific server rack or server room. Also, note that instructions can generally identify a particular quantity of energy for a specific computing device or set of computing devices without necessarily dictating when (e.g., time slices) the energy should be drawn.

Capping Using Modulated Electricity

In some cases, energy and/or power capping can be implemented by circuit protection techniques, such as circuit breakers, fuses, and/or disabling electrical equipment such as generators, transformers, etc. For example, in frequency modulation implementations, 50 Hz electrical equipment can be provided with circuit protection equipment that causes the 50 Hz electrical equipment to stop drawing power when 50 Hz power is overloaded, e.g., if the demand for 50 Hz power is causing power factor, voltage, or frequency to fall outside of specified boundaries. Because disabling the equipment reduces the draw of 50 Hz power, this can effectively provide a form of energy and/or power capping in these implementations. Circuit protection equipment can also provide for energy and/or power capping in temporal modulation implementations as well.

In both frequency modulation and temporal modulation implementations, power capping can also be performed by the power management system 370 instructing various computing devices and/or associated electrical equipment to reduce the amount of power drawn at specified frequencies or time slices. As noted above, equipment drawing at a specific frequency can be instructed to reduce or cease power usage when availability of energy at that specific frequency is constrained. Likewise, individual devices can be reconfigured to use different time slices or turned off completely.

Design Alternatives

Note that this document introduces concepts that can be employed in a wide variety of configurations. As one example, some implementations may provide a dual-frequency capable computing device that can operate on multiple different frequencies. For example, a single computing device can be provided with a single battery, a 50 Hz bandpass filter, a 60 Hz bandpass filter, and corresponding switches associated with each filter. The computing device may have associated processing capability to control the switches to use the different frequencies at different times, e.g., responsive to instructions from the power management system 310, based on different costs for electricity on the different frequencies, etc. Such a computing device can also include a frequency sensing circuit (e.g., an integrated circuit) that senses available frequencies on a single electrical line and selectively draws from individual frequencies at different times based on the instructions. In further implementations, such a computing device can have an array of filters, rectifiers, and/or frequency sensing circuits and be able to draw power from many more frequencies (e.g., 100 frequencies each having an associated switch and filter). In some cases, the computing device can be instructed to draw specific percentages of power from different frequencies, e.g., draw 10% of its power from 50 Hz, 60% from 60 Hz, and 30% from 70 Hz. These percentages can change over time depending on how the power management system determines to allocate power consumption. Note that such a computing device need not be configured for deployment in a server installation and could be embodied as a mobile computing device, laptop, desktop, smart appliance (e.g., a refrigerator or thermostat), etc.

Furthermore, some implementations may combine frequency and temporal modulation on a single electrical line. A computing device as described above, with multiple filters and switches, could be assigned a first series of time slices on a first frequency and a second series of time slices on a second frequency. Energy storage could be charged by either frequency, thus enabling the device to operate regardless of which frequency is used to charge the storage. This could be useful during times when renewable energy is scarce to reduce the usage of green energy at 50 Hz by assigning fewer time slices to individual computing devices for charging the energy storage and adding additional time slices of brown energy. The net power consumption by the server computing device would not necessarily change, but this still provides the power management system 370 with the ability to manage how the different sources of power are utilized by sending the computing device instructions to use specific time slices to draw specific frequencies.

Note also that a single computing device could also have two time slice circuits that are both powered using the same frequency. For example, a first rectifier and switch could charge a battery during a first series of time slices and a second rectifier and switch could charge the battery during a second series of time slices. For example, the first set of time slices could represent green energy and the second set could represent brown energy, or energy from different sources, different prices, etc. The power management system 370 could instruct the first switch to draw during a different set of time slices than the second switch.

Also, note that the aforementioned discussion focuses on DC energy storage, such as batteries, in the time slice implementations. However, alternating current energy storage, such as flywheels, can also be used consistent with the disclosed implementations. Furthermore, energy storage can also be used with frequency modulation examples. For example, assume 50 Hz green power tends to be available intermittently and 60 Hz brown power tends to be almost always available. Electrical equipment configured to run on 60 Hz could run directly on brown power. The 50 Hz green power, when available, could be used to charge an energy storage device connected to an inverter that produces 60 Hz current. Thus, certain computing devices could still be powered by green power when the green power is not directly available and only switch to brown power when the energy storage is discharged completely or below a certain level.

Furthermore, note that modulated electricity characteristics can be used for auditing/tracking electricity usage. For example, some implementations may track usage of different frequencies or time slices by providing one or more meters in any of the circuits or scenarios discussed herein. One specific implementation provides a metered uninterruptible power supply that tracks green vs. brown energy used to charge its batteries. In this case, computing devices powered by the metered uninterruptible power supply might be powered by both brown and green energy sources, and the uninterruptible power supply can report the percentage of green and brown energy used by the servers over any given period of time. In further implementations, similar techniques can be applied by metering usage at the power distribution unit, server chassis, etc.

In some implementations, the power management system 370 may control individual computing devices to provide green and brown functionality. For example, if metering indicates that 70% of the computing devices are running on brown power and 30% on green power, then the power management system 370 may provide 7 brown virtual machines and 3 green virtual machines on a single computing device (or across multiple computing devices) and adjust the number of brown/green virtual machines as percentages change (e.g., to 6 brown and 4 green when running on 60% brown power and 40% green power). As another example, some implementations may track how much power a given tenant is using when renting computing devices (running tenant code in the server installation). This can be determined based on the number of time slices assigned to that tenant or by tracking electricity drawn at a specific frequency assigned to that tenant.

Computing Hardware Implementations

Referring back to FIG. 3, environment 300 as shown includes several components. In this case, for purposes of explanation, the components are characterized as a power generation facility 310, power consumers 330, 340, and 350, server installation 100, and power management system 370. In this example, the power management system can be manifest as a server computing device, desktop, tablet, laptop device, etc. Generally, so long as a device has some computational hardware, the device can act as the power management in accordance with the disclosed implementations. Likewise, so long as a device has some computational hardware, the device can implement the power management control module 373. Of course not all device implementations can be illustrated and other device implementations should be apparent to the skilled artisan from the description above and below.

As previously noted, the terms "computer," "computing device," "client device," and/or "server device" as used herein can mean any type of device that has some amount of hardware processing capability (e.g., processing resources 371). Computers, computing devices, client devices, and server devices can also have hardware storage/memory capability (e.g., memory/storage resources 372). Processing capability can be provided by one or more processors (e.g., hardware processing units/cores) that can execute computer-readable instructions to provide functionality. Computer-readable instructions and/or data can be stored on storage, such as storage/memory and or a data store.

The storage/memory can be internal or external to the device. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general purpose processor and storage/memory. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality.

In addition, some implementations may use dedicated logic circuits or controllers such as application-specific integrated circuits ("ASICs") or field-programmable gate arrays ("FPGAs"). In particular, electrical hardware can be configured with such dedicated logic circuits to respond to instructions from the power management system 370 (e.g., turning on and off a switch or filter). Thus, the term "processor" as used herein can also refer to central processing units (CPUs), graphical processing units (CPUs), controllers, microcontrollers, processor cores, dedicated logic circuits, or other types of processing devices suitable for implementation both in conventional computing architectures as well as SOC designs.

In some configurations, the power management module 373 can be installed as hardware, firmware, or software during manufacture of the device or by an intermediary that prepares the device for sale to the end user. In other instances, the end user may install the power management module later, such as by downloading executable code and installing the executable code on the corresponding device.

Also note that computing devices generally can have input and/or output functionality. For example, computing devices can have various input mechanisms such as keyboards, mice, touchpads, voice recognition, etc. Devices can also have various output mechanisms such as printers, monitors, etc.

Also note that the devices described herein can function in a stand-alone or cooperative manner to implement the described techniques. For example, each of the methods described herein can be performed on a single computing device and/or distributed across multiple computing devices that communicate over network(s) 380. Without limitation, network(s) 380 can include one or more local area networks (LANs), wide area networks (WANs), the Internet, and the like, as well as electrical lines in implementations where power line communication is used to implement the disclosed techniques.

Further Examples

The various examples disclosed herein can include a first system example that includes a filter configured to receive modulated electricity having at least two different alternating current frequencies over an electrical line, the at least two different alternating current frequencies including a first alternating current frequency and a second alternating current frequency, and attenuate the second alternating current frequency of the modulated electricity to obtain filtered modulated electricity that is predominantly of the first alternating current frequency. The first system example can also include a computing device powered by the filtered modulated electricity. In a second system example, the first system example can include a second filter configured to receive the modulated electricity having the at least two different alternating current frequencies over the electrical line, and attenuate the first alternating current frequency of the modulated electricity to obtain second filtered modulated electricity that is predominantly of the second alternating current frequency. The second system example can also include a second computing device powered by the second filtered modulated electricity. In a third system example, the first system example or second system example includes a processor configured to cap energy usage of the first alternating current frequency differently than the second alternating current frequency. In a fourth system example, the processor of the third system example is further configured to stop the first computing device from drawing power via the first alternating current frequency while allowing the second computing device to continue drawing power via the second alternating current frequency. In a fifth system example, the modulated electricity of the first through fourth system examples includes green power that is produced by a renewable energy source and modulated at the first alternating current frequency and brown power that is produced by a fossil fuel energy source and modulated at the second alternating current frequency. In a sixth system example, the fifth system example includes a processor configured to separately track usage of the green power and the brown power. In a seventh system example, the first through sixth system examples include a local power source and electrical hardware configured to modulate local power from the local power source into the first alternating current frequency. In an eighth system example, the first through seventh system examples include an electrical line carrying the local power at the first alternating current frequency and other power provided by an electrical grid at the second alternating current frequency.

The various examples disclosed herein can include a first method example that includes assigning a set of time slices to a computing device for drawing electricity and subsequently causing the computing device to adjust consumption of the electricity by assigning a different set of time slices to the computing device. In a second method example, the first method example includes analyzing availability of electrical power and determining the different set of time slices based on the analyzing the availability of the electrical power. In a third method example, the first or second method examples include causing the computing device to reduce consumption of the electricity by reducing a number of time slices assigned to the computing device. In a fourth method example, the first through third method examples include causing the computing device to increase consumption of the electricity by increasing a number of time slices assigned to the computing device. In a fifth method example, the first through fourth method examples include sending an instruction to the computing device or electrical equipment used to power the computing device, the instruction identifying the different time slices. In a sixth method example, the instruction of the fifth method example is sent to a switch that controls charging of a battery that powers the computing device.

The various examples disclosed herein can include an additional first system example that includes a computing device and electrical hardware configured to selectively draw electricity during assigned time periods power the computing device using the electricity that is selectively drawn during the assigned time periods. In a second additional system example, the first additional system example includes an energy storage device that is configured to power the computing device by charging the energy storage device during the assigned time periods. In a third additional system example, the electrical hardware of the first or second additional system examples is configured to convert the electrical energy from alternating current to direct current to charge the energy storage device. In a fourth additional system example, the first through third additional system examples include a processor configured to receive a time slice assignment identifying the assigned time periods over a computer network or over an electrical line. In a fifth additional system example, the electrical hardware of the first through fourth additional system examples includes a switch and the processor is configured to control the switch to present high resistance during unassigned time slices and low resistance during the assigned time slices. In a sixth additional system example, the processor of the fourth or fifth additional system example is configured to detect a packet including the time slice assignment on the computer network or the electrical line and determine that the packet indicates that the time slice assignment is for powering the computing device.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

The invention claimed is:

1. A system comprising:
    a filter configured to:
        receive mixed-frequency electricity having green electricity generated by a renewable power source mixed with brown electricity generated by a carbon fuel source, the green electricity being modulated at a first alternating current frequency and the brown electricity being modulated at a second alternating current frequency, and
        attenuate the second alternating current frequency of the mixed-frequency electricity to obtain filtered green electricity that is predominantly of the first alternating current frequency; and
    a computing device configured to designate computing jobs powered by the filtered green electricity as green computing jobs and other computing jobs powered by the brown electricity as brown computing jobs.

2. The system of claim 1, further comprising:
    a second filter configured to:
        receive the mixed-frequency electricity having the green electricity modulated at the first alternating current frequency and the brown electricity modulated at the second alternating current frequency, and
        attenuate the first alternating current frequency of the mixed-frequency electricity to obtain filtered brown electricity that is predominantly of the second alternating current frequency, the filtered brown electricity being used to power the brown computing jobs.

3. The system of claim 2, further comprising:
    a first server powered by the filtered green electricity and configured to run the green computing jobs; and
    a second server powered by the filtered brown electricity and configured to run the brown computing jobs.

4. The system of claim 3, wherein the computing device is further configured to:
    send an instruction to the first server to reduce consumption of the filtered green electricity while allowing the second server to continue uncapped consumption of the filtered brown electricity.

5. The system of claim 3, wherein the computing device is configured to:
    send an instruction to a switch, the instruction causing the switch to open and prevent the filtered green electricity from reaching the first server.

6. The system of claim 2, further comprising a meter configured to separately meter usage of the filtered green electricity and the filtered brown electricity.

7. The system of claim 2, the renewable power source being a local renewable power source, the system further comprising:
    electrical hardware configured to modulate the green electricity generated by the local renewable power source into the first alternating current frequency.

8. The system of claim 7, further comprising an electrical line carrying the green electricity at the first alternating current frequency and the brown electricity at the second alternating current frequency, the brown electricity being provided by an electrical grid.

9. A system comprising:
    an electrical line carrying modulated electricity having green electricity produced by a green power source and brown electricity produced by a brown power source modulated at different alternating current frequencies, the green electricity being modulated at a first alternating current frequency and the brown electricity being modulated at a second alternating current frequency;

a filter configured to attenuate the second alternating current frequency to obtain filtered green electricity;

a rectifier configured to convert the filtered green electricity into direct current; and a computing device configured to run green computing jobs powered by the direct current.

10. The system of claim 9, further comprising:
a battery charqeable by the rectifier, the computing device drawing the direct current from the battery.

11. The system of claim 9, the computing device being configured to draw the direct current from the rectifier.

12. The system of claim 9, further comprising:
a second filter configured to attenuate the first alternating current frequency to obtain filtered brown electricity;

a second rectifier configured to convert the filtered brown electricity into second direct current; and a second computing device configured to run brown computing jobs powered by the second direct current.

13. A method comprising:
obtaining mixed-frequency electricity having green electricity produced by a renewable power source and brown electricity produced by a fossil fuel power source modulated at different alternating current frequencies, the green electricity being modulated at a first alternating current frequency and the brown electricity being modulated at a second alternating current frequency;

attenuating the second alternating current frequency of the mixed-frequency electricity to obtain filtered green electricity that is predominantly of the first alternating current frequency; and powering green jobs on a computing device using the filtered green electricity.

14. The method of claim 13, further comprising:
rectifying the filtered green electricity to provide green direct current; and powering the computing device using the green direct current.

15. The method of claim 14, further comprising:
attenuating the first alternating current frequency to obtain filtered brown electricity that is predominantly of the second alternating current frequency; and powering brown computing jobs on a second computing device using the filtered brown electricity.

16. The method of claim 15, further comprising:
rectifying the filtered brown electricity to provide brown direct current; and powering the second computing device using the brown direct current.

17. The method of claim 16, further comprising:
charging a first battery with the green direct current;
charging a second battery with the brown direct current;
powering the computing device with the first battery; and
powering the second computing device with the second battery.

18. The method of claim 13, further comprising:
receiving an instruction to stop drawing green electricity; and responsive to the instruction, causing the computing device to stop drawing the filtered green electricity.

19. The method of claim 13, further comprising:
generating the green electricity with a renewable energy generator that produces green direct current; and inverting the green direct current into the first alternating current frequency.

20. The method of claim 19, further comprising:
mixing the green electricity at the first alternating current frequency with the brown electricity at the second alternating current frequency.

* * * * *